(12) United States Patent
Staton

(10) Patent No.: US 8,899,562 B1
(45) Date of Patent: Dec. 2, 2014

(54) APPARATUS FOR DISPERSING IMPACT FORCES

(71) Applicant: Fielding B. Staton, Liberty, MO (US)

(72) Inventor: Fielding B. Staton, Liberty, MO (US)

(*) Notice: Subject to any disclaimer, the term of this patent is extended or adjusted under 35 U.S.C. 154(b) by 0 days.

(21) Appl. No.: 14/310,899

(22) Filed: Jun. 20, 2014

Related U.S. Application Data

(63) Continuation-in-part of application No. 14/188,303, filed on Feb. 24, 2014, now Pat. No. 8,789,818, and a continuation-in-part of application No. 13/796,170, filed on Mar. 12, 2013, now Pat. No. 8,695,955.

(60) Provisional application No. 61/988,024, filed on May 2, 2014.

(51) Int. Cl.
*F16F 15/00* (2006.01)
*G08B 21/18* (2006.01)
*F16F 7/00* (2006.01)

(52) U.S. Cl.
CPC .. *G08B 21/18* (2013.01); *F16F 7/00* (2013.01)
USPC ........................................ 267/140.13; 267/89

(58) Field of Classification Search
USPC ................. 267/89, 195, 204, 216, 104.13
See application file for complete search history.

(56) References Cited

U.S. PATENT DOCUMENTS

| | | | |
|---|---|---|---|
| 2,950,576 A * | 8/1960 | Rubenstein | 52/223.13 |
| 3,467,973 A * | 9/1969 | Minnick | 5/719 |
| 3,783,568 A * | 1/1974 | Adler et al. | 52/204.597 |
| 5,348,363 A * | 9/1994 | Fink | 296/91 |
| 7,461,726 B2 * | 12/2008 | Hawkins et al. | 188/371 |
| 8,303,027 B2 * | 11/2012 | Murakami et al. | 296/190.1 |

* cited by examiner

*Primary Examiner* — William Gilbert
(74) *Attorney, Agent, or Firm* — Lathrop & Gage LLP

(57) ABSTRACT

Apparatus for dispersing impact forces are provided. An apparatus for dispersing impact forces includes a housing having a contact end with an aperture; a contact member located at least primarily inside the housing; a biasing member biasing the contact member toward the housing aperture; and a sensor. The housing contact end is secured to an impact receiving surface. The sensor initiates an alert when an impact force received on the impact receiving surface causes the contact member to shift a predetermined distance from an initial position.

20 Claims, 29 Drawing Sheets

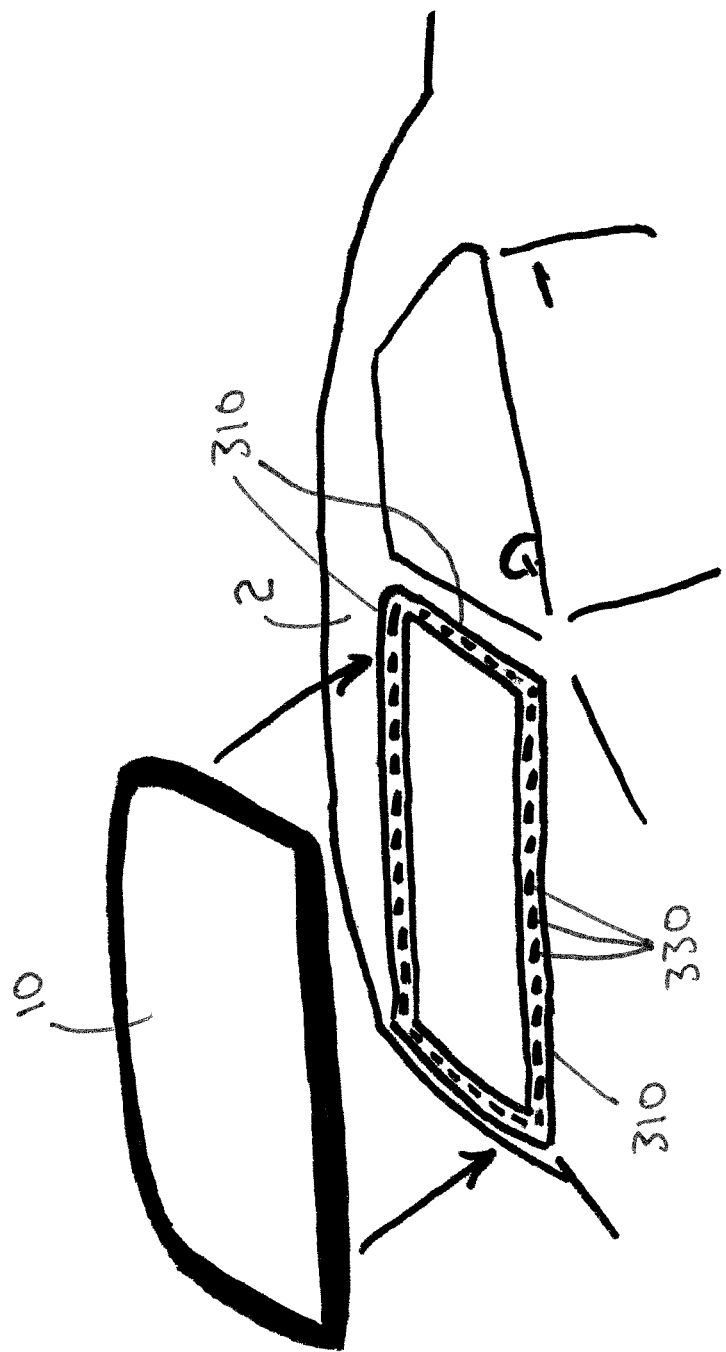

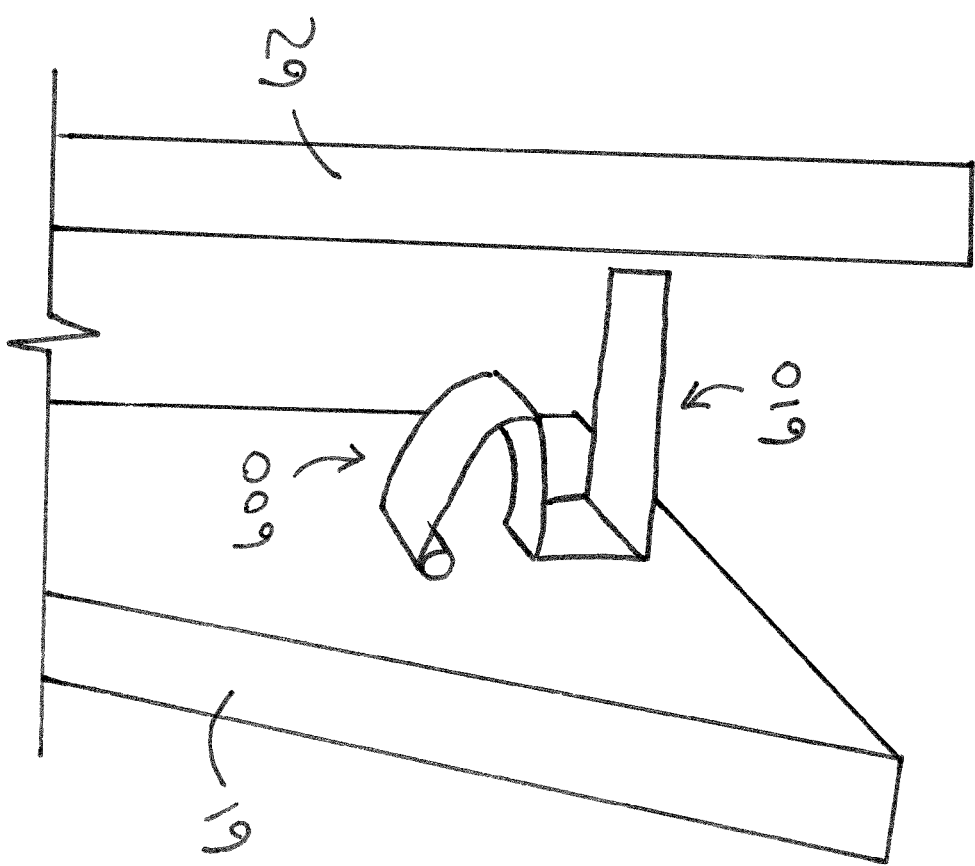

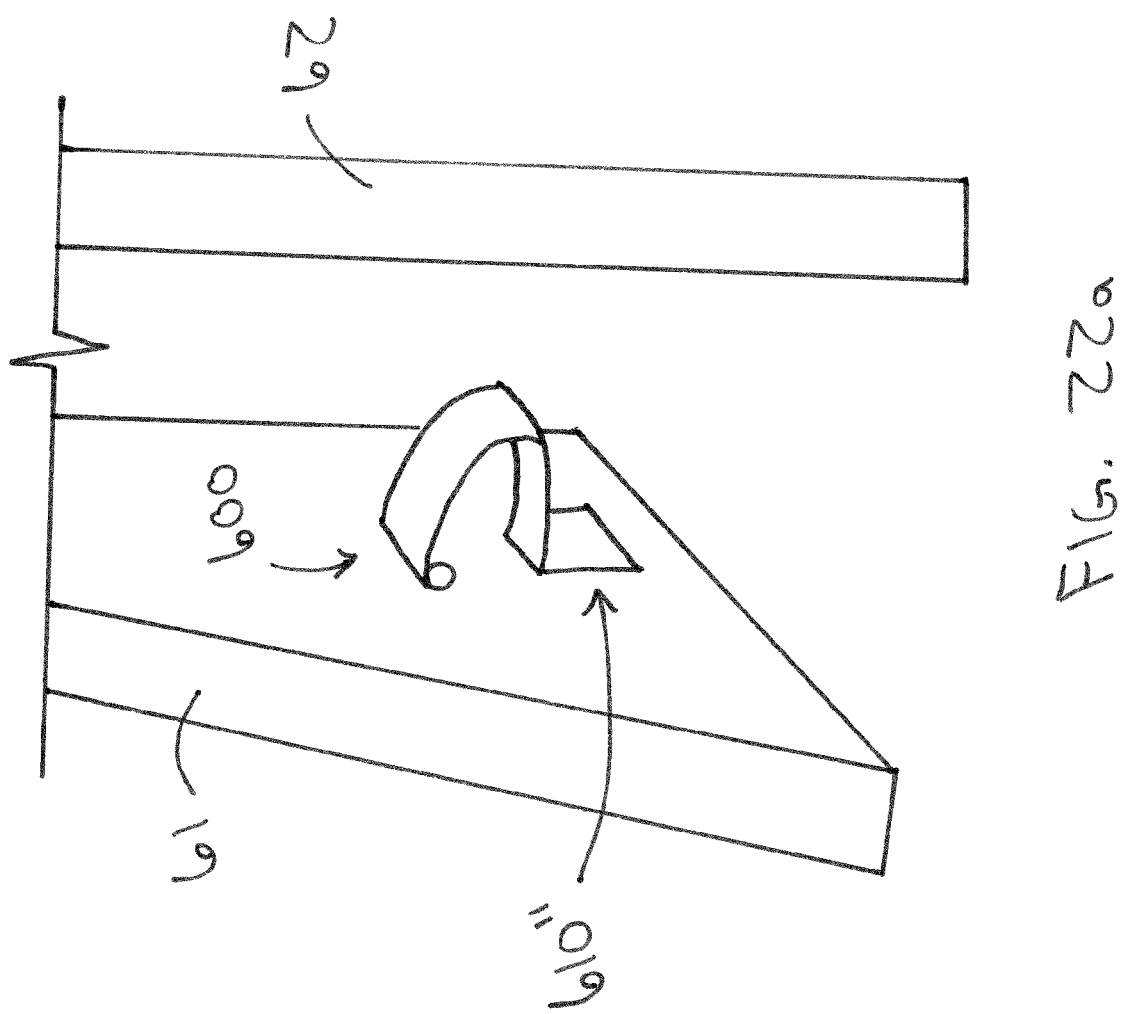

APPARATUS FOR DISPERSING IMPACT FORCES

RELATED APPLICATIONS

This application claims priority to U.S. Provisional Application No. 61/988,024, filed May 2, 2014 and is a continuation-in-part of U.S. application Ser. No. 13/796,170, filed Mar. 12, 2013, now U.S. Pat. No. 8,695,955, and U.S. application Ser. No. 14/188,303, filed Feb. 24, 2014, the disclosures of which are incorporated by reference in their entireties herein.

BACKGROUND

Impact forces received upon particular materials may compromise the integrity of the material and the purpose for which it is used. For example, glass is an amorphous solid material that is used extensively in everyday life. However, glass products such as automobile windshields and home windows are particularly prone to encounter debris that may result in some degree of cracking, chipping, or even shattering (collectively "breakage"). Rocks are often encountered by automobile tires and projected at following traffic, and lawn mowers may similarly propel debris at windows (and especially those that are adjacent the ground). While manufacturing advancements have been made to improve the resilience of glass products, such improved products may be undesirably expensive and may nevertheless still be susceptible to breakage. Further, those manufacturing advancements do not aid existing products that were made with older technology.

Some embodiments set forth herein may inhibit glass breakage without requiring any changes to how the glass is manufactured. Other embodiments set forth herein may be incorporated in the glass manufacturing process as an alternative, or enhancement, to other anti-breakage technologies.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, an apparatus for inhibiting glass breakage includes a housing, a contact member, and a biasing member. The housing has a contact end with an aperture, and the contact member is disposed at least primarily inside the housing. The biasing member biases the contact member toward the housing aperture. Means for fixing the housing contact end to a glass surface are further included.

In another embodiment, a method for inhibiting glass breakage begins with obtaining an apparatus having: (a) a housing having a contact end with an aperture; (b) a contact member disposed at least primarily inside the housing; and (c) a biasing member biasing the contact member toward the housing aperture. The housing contact end is then adhered to a glass item, and impact force is transferred from the glass item to the biasing member via the contact member.

In still another embodiment, a glass product includes a sheet of glass and an apparatus for inhibiting glass breakage. The apparatus for inhibiting glass breakage includes: (a) a housing having a contact end with an aperture; (b) a contact member disposed at least primarily inside the housing; and (c) a biasing member biasing the contact member toward the housing aperture. The housing contact end is coupled to the sheet of glass, and the contact member rests upon the sheet of glass for receiving an impact force from the sheet of glass.

In yet another embodiment, a glass product includes a first sheet of glass, a second sheet of glass laminated to the first sheet of glass, and an apparatus for inhibiting glass breakage. The second sheet of glass has an opening therein, and the apparatus for inhibiting glass breakage includes: (a) a housing having a contact end with a first aperture; (b) a first contact member disposed at least primarily inside the housing; and (c) a biasing member biasing the first contact member toward the first aperture. The housing contact end is coupled to at least one of the first sheet of glass and the second sheet of glass, and the contact member passes through the opening in the second sheet of glass and rests upon the first sheet of glass for receiving an impact force from the first sheet of glass.

In another embodiment, an apparatus for dispersing impact forces includes a housing having a contact end with an aperture; a contact member located at least primarily inside the housing; a biasing member biasing the contact member toward the housing aperture; and means for securing the housing contact end to a surface. When an impact force is received upon the impact receiving surface, the force is at least partially transferred to the contact member, which in turn temporarily alters the biasing member, which subsequently returns the contact member to an initial position. The return of the contact member imparts a second force on the impact receiving surface, which is less than the impact force transferred to the contact member.

In still another embodiment an apparatus for dispersing impact forces is provided, which includes a base, a rail, a contact member for contacting an impact receiving surface, a first biasing member located between the base and the rail, and a second biasing member located between the rail and the contact member. The first biasing member biases the rail toward a rest position and the second biasing member biases the contact member toward an initial position at the impact receiving surface. An impact force received on the impact receiving surface is at least partially transferred to the contact member, which temporarily alters the second biasing member. The contact member is subsequently returned to the initial position, which imparts a second force on the impact receiving surface.

In still yet another embodiment, an apparatus for dispersing impact forces includes a base, a contact member for contacting an impact receiving surface, and a primary biasing member disposed between the base and the contact member. The primary biasing member biases the contact member toward an initial position at the impact receiving surface. An impact force received on the impact receiving surface is at least partially transferred to the contact member, which in turn temporarily alters the primary biasing member which subsequently returns the contact member to the initial position. The return of the contact member to the initial position imparts a second force on the impact receiving surface.

In still a further embodiment, a window product includes a first window pane, a second window pane, and an apparatus for dispersing impact forces. The apparatus for dispersing impact forces has a base, a contact member for contacting the first window pane, and a primary biasing member disposed between the base and the contact member. The primary biasing member biases the contact member toward an initial position at the first window pane. An impact force received on the first window pane is at least partially transferred to the contact member, which in turn temporarily alters the primary biasing member which subsequently returns the contact member to the initial position. The return of the contact member to the initial position imparts a second force on the first window pane.

In still another embodiment, an apparatus for dispersing impact forces is provided which includes a housing having a contact end with an aperture; a contact member located at least primarily inside the housing; a biasing member biasing the contact member toward the housing aperture; and a sensor. The housing contact end is secured to an impact receiving surface. The sensor initiates an alert when an impact force received on the impact receiving surface causes the contact member to shift a predetermined distance from an initial position.

Provided in still yet another embodiment is an apparatus for dispersing impact forces having a base; a contact member for contacting an impact receiving surface; a biasing member disposed between the base and the contact member; and a sensor. The biasing member biases the contact member toward an initial position at the impact receiving surface; and the sensor initiates an alert when an impact force received on the impact receiving surface causes the contact member to shift from an initial position.

In yet another embodiment, a window product includes a window pane and an apparatus for dispersing impact forces. The apparatus for dispersing impact forces has a base; a contact member positioned to receive force from the window pane; a biasing member disposed between the base and the contact member; and a sensor. The biasing member biases the contact member toward an initial position at the window pane. An impact force received on the window pane cause the contact member and the biasing member to move. The movement of the contact member or the biasing member activates the sensor, causing the sensor to initiate an alert.

In still a further embodiment is provided a monitoring system having an input device, an alarm, a processor, and electronic instructions. The input device includes a housing having a contact end with an aperture; a contact member located at least primarily inside the housing; a biasing member biasing the contact member toward the housing aperture; at least one sensor; and means for securing the housing contact end to an impact receiving surface. The processor is in data communication with the sensor, and the electronic instructions, when executed by the processor, performs steps for (a) receiving at least one signal from the sensor; (b) analyzing the at least one signal to identify a triggering event; and (c) upon identifying a triggering event, actuating the alarm.

BRIEF DESCRIPTION OF DRAWINGS

FIG. 12a is an exploded view showing another embodiment of the apparatus of FIG. 8 in an example use.

FIG. 22 is a perspective view of an apparatus for inhibiting glass breakage and a resulting glass product according to a still further embodiment of the current invention.

FIG. 22a shows an alternate base portion for use in the apparatus of FIG. 19.

DETAILED DESCRIPTION

Figure 1:
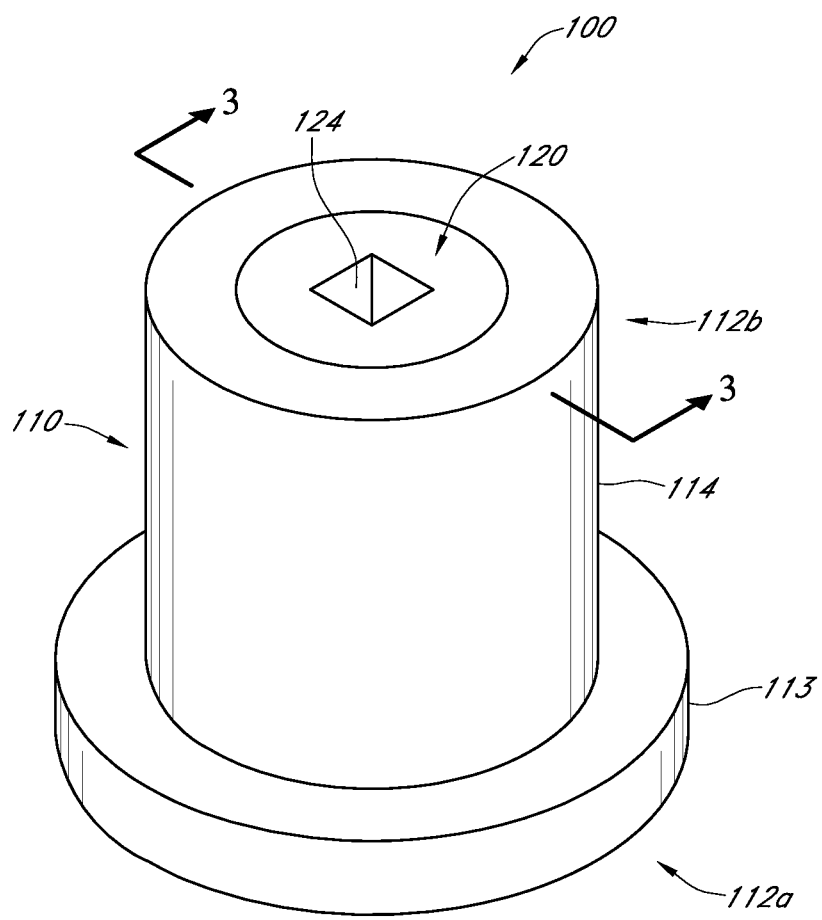
FIG. 1 is a perspective view showing an apparatus for inhibiting glass breakage according to one embodiment of the current invention, with a distal end of the apparatus visible.

FIGS. 1 through 4 show an apparatus for inhibiting glass breakage according to one embodiment 100 of the current invention. The apparatus 100 broadly includes a housing 110, a contact member 130, and a biasing member 140.

Figure 2:
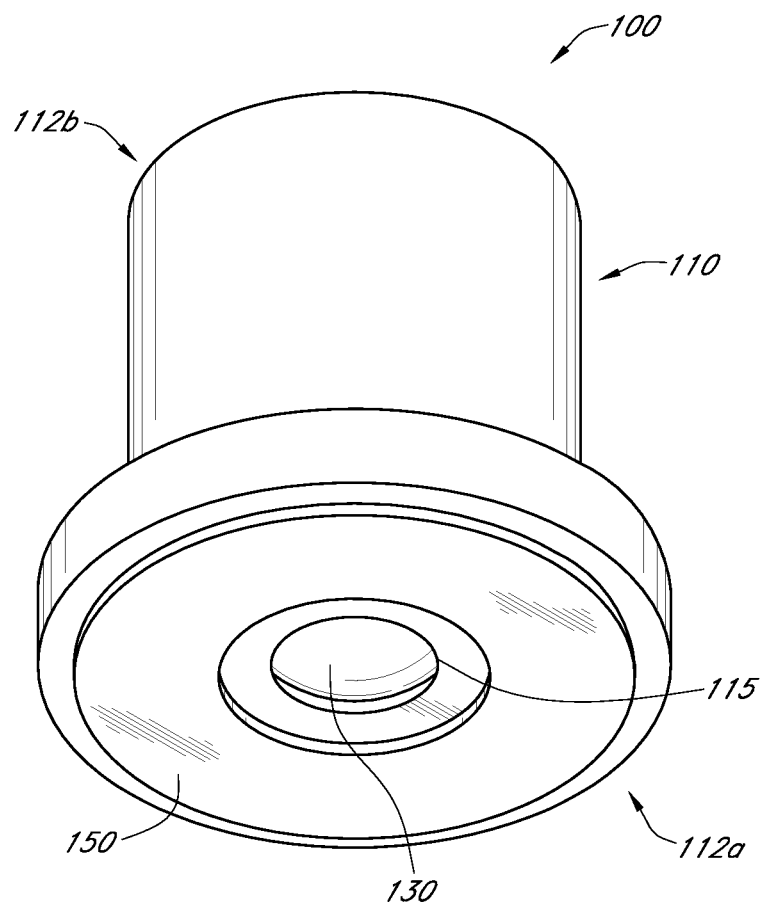
FIG. 2 is a perspective view of the apparatus of FIG. 1, with a proximal (or "contact") end of the apparatus visible.
Figure 3:
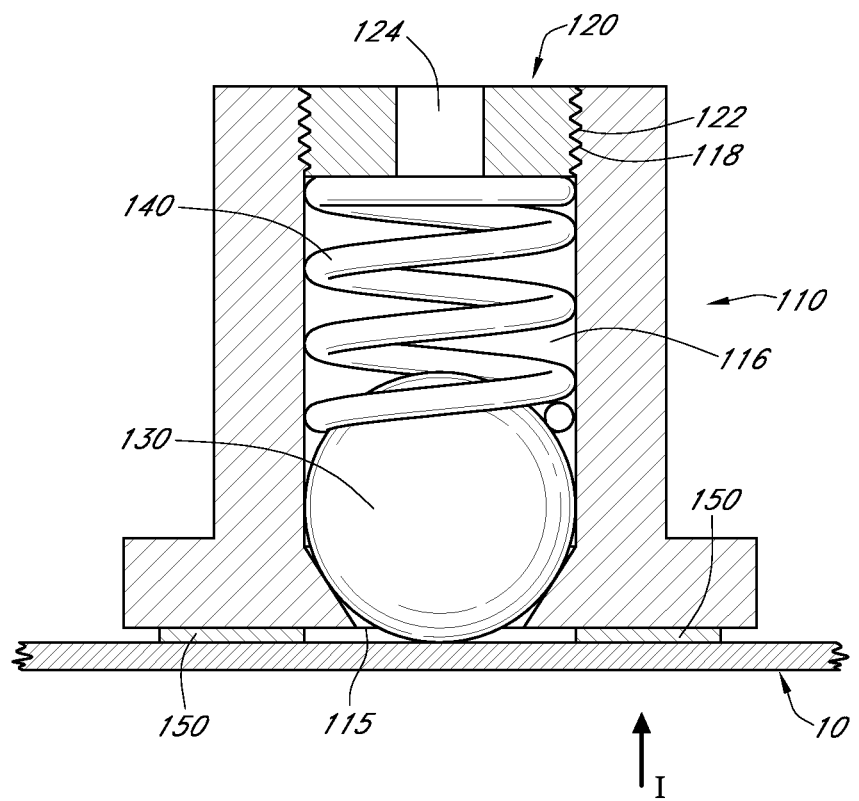
FIG. 3 is a side view of the apparatus of FIG. 1 in use, with various elements shown in section taken along line 3-3 in FIG. 1.
Figure 4:
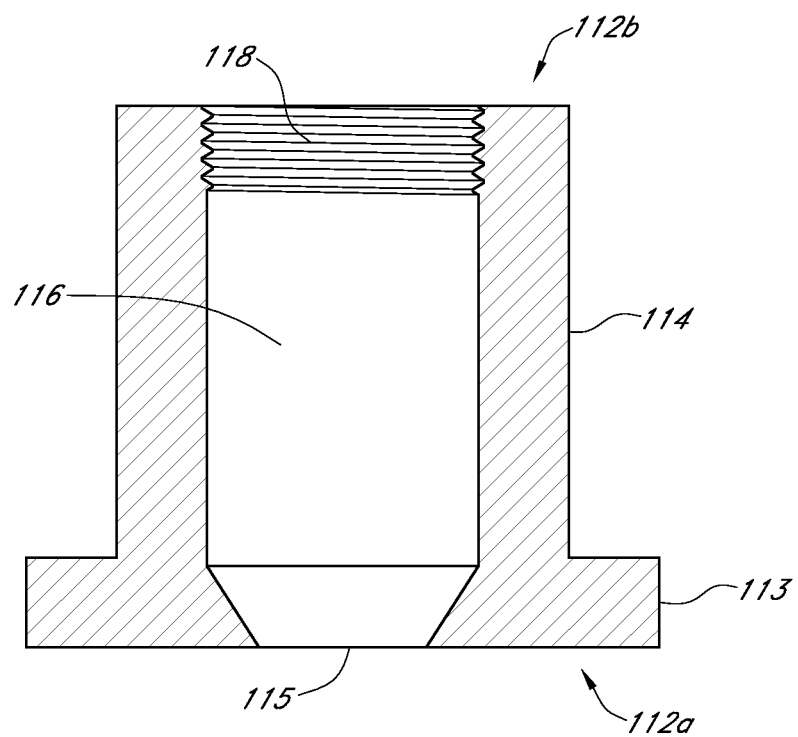
FIG. 4 is a section view of the housing of FIG. 3.

The housing 110 has a contact end 112a opposite a distal end 112b, and the contact end 112a has an aperture 115 (FIGS. 2 through 4). While the housing 110 may be configured in various ways, it may be desirable for the contact end 112a to have a surface area that is greater than a surface area of the distal end 112b. Such increased surface area at the contact end 112a may allow the housing 110 to be better coupled to a glass surface (as discussed further below) while minimizing the size of the housing 110 at the distal end 112b. The housing 110 is shown to have a first portion 113 extending from the contact end 112a and a second portion 114 extending from the distal end 112b, with each portion 113, 114 being generally cylindrical and extending to one another. While such configuration is currently preferred in the embodiment 100, other geometries (conical, rectangular, octagonal, irregular geometries, more or fewer portions, et cetera) may nevertheless be used.

The housing 110 may be constructed of plastic, metal, composites, and/or any other appropriate material. Moreover, various manufacturing processes may be used to form the housing, such as molding, casting, machining, and/or 3-D printing. While in some embodiments the housing 110 is formed as a unitary element, in other embodiments it may be multiple elements coupled together. For example, the first portion 113 may be fastened to the second portion 114 after each portion 113, 114 is formed.

The contact member 130 (FIGS. 2 and 3) is disposed at least primarily inside the housing 110, and specifically in a cavity 116 defined by the housing 110, and the biasing member 140 (FIG. 3) is similarly disposed in the cavity 116 and biases the contact member 130 toward the housing aperture 115. In the embodiment 100, the aperture 115 is round and smaller than the contact member 130 such that the contact member 130 cannot completely pass through the aperture 115.

As shown in FIG. 3, it may be desirable for the contact member 130 to be generally spherical to provide a single point of contact between the contact member 130 and a sheet of glass 10 with which the apparatus 100 will be used. In addition, a spherical configuration may allow the contact member 130 to be easily seated in the housing 110 at the aperture 115. Nevertheless, the contact member 130 may be configured to be shaped differently and the aperture 115 may be shaped complementary to the configuration of the contact member 130.

The contact member 130 may be constructed of entirely non-elastic material (e.g., metal). However, it may be desirable for the contact member 130 to be made at least partially of a resilient material such as rubber, or other materials such as glass. A rubberized coating on a non-elastic material may be particularly suitable, allowing some energy to be absorbed upon impact of the glass 10 and the contact member 130 yet transferring most of an impact force from the glass 10 to the biasing member 140.

The biasing member 140 in the embodiment 100 is a helical spring, as shown in FIG. 3. Other types of resilient members may alternately (or additionally) be used in different embodiments, such as a flat spring, a gas spring, a hydraulic spring, or a magnetic spring. An endcap 120 is coupled to the housing 110 to prevent the contact member 130 from exiting the housing 110, and the biasing member 140 may abut the endcap 120, as shown in FIG. 3. The housing 110 includes threading 118 (FIGS. 3 and 4), and the endcap 120 includes complementary threading 122 for coupling the endcap 120 to the housing 110. The endcap 120 may further include a passage or other element 124 for receiving a driver bit, allowing the endcap 120 to be fastened to the housing 110. While other embodiments may use fastening methods besides threading (for example, adhesive or fusing), it may be desirable for the endcap 120 to be adjustably coupled to the housing 110; such adjustment may allow an amount of force on the contact member 130 provided by the biasing member 140 to be altered as desired.

Various means may be included for fastening the housing contact end 112a to the glass 10 (which may or may not be generally planar). As shown in FIGS. 2 and 3, adhesive 150 may be used to couple the contact end 112a to the glass 10. Especially if the housing contact end 112a is generally flat or otherwise not of the same curvature as the glass 10, the adhesive 150 may be particularly desirable to fill the area between the contact end 112a and the glass 10 and provide a strong bond. Nevertheless, other embodiments may use magnetic fasteners, fusing processes, and other suitable fastening technology.

In use, the apparatus 100 is adhered to (or otherwise coupled to) the glass 10, as shown for example in FIG. 3. The biasing member 140 biases the contact member 130 toward the aperture 115, and the contact member 130 extends through the aperture 115 and contacts the glass 10. The system may remain in this configuration until the glass 10 receives an impact force I. For example, the glass 10 may be a windshield or a residential window, and flying debris may provide the impact force I. Upon receipt of the impact force I, the glass 10 may transfer at least a portion of the impact force I to the contact member 130, which in turn may move from the contact end 112a and transfer force to the biasing member 140. The biasing member 140 may then return to its prior configuration, moving the contact member 140 back through the aperture 115 and contacting the glass 10.

Inefficiencies in the biasing member 140, for example, may cause less than the full amount of force transferred to the contact member 130 from the glass 10 to be returned to the glass 10. This may be particularly advantageous if multiple apparatus 100 are used with the glass 10. In addition, if multiple apparatus 100 are used with the glass 10, the timing of the force transfer may vary slightly between the different apparatus 100, allowing forces to be transferred back to the glass 10 at different times. The glass 10 may be able to withstand this staggered return of forces better than the impact force I if the multiple apparatus 100 were not utilized.

Figure 5:
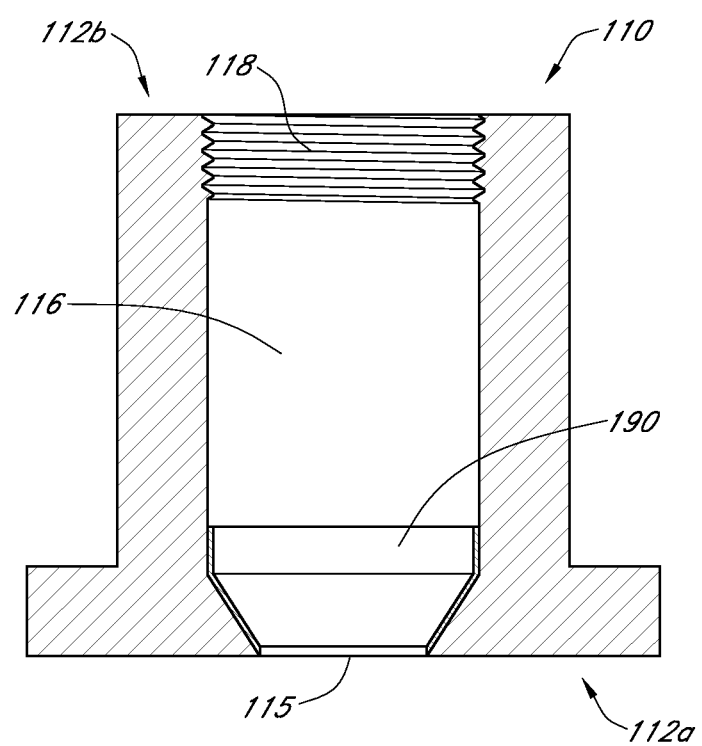
FIG. 5 is a section view showing a cushion member added inside the housing of FIG. 4.

To further dissipate the impact force I, a cushion 190 may be placed in the housing 110, as shown in FIG. 5. In such embodiments, the cushion 190 may be initially compressed when the contact member 130 contacts the glass 10. Upon movement of the contact member 130 away from the aperture 115 (and the cushion 190), the cushion 190 may expand. The cushion 190 may then absorb some force from the contact member 130 when the contact member 130 is returned to the glass 10, causing the cushion 190 to return to the compressed configuration.

The cushion 190 may be constructed of, for example, open celled polyurethane, and fast-recovery memory foam may be particularly useful. Those skilled in the art will appreciate that other materials which may quickly return to their original configuration after being compressed may similarly be used.

While the positioning of the apparatus 100 may vary (based, for example, on the type of glass application), in some embodiments where the glass 10 is a windshield, multiple apparatus 100 may be dispersed along a perimeter of the glass 10 and/or behind the rear view mirror so as not to unnecessarily obstruct the driver's view.

Figure 6:
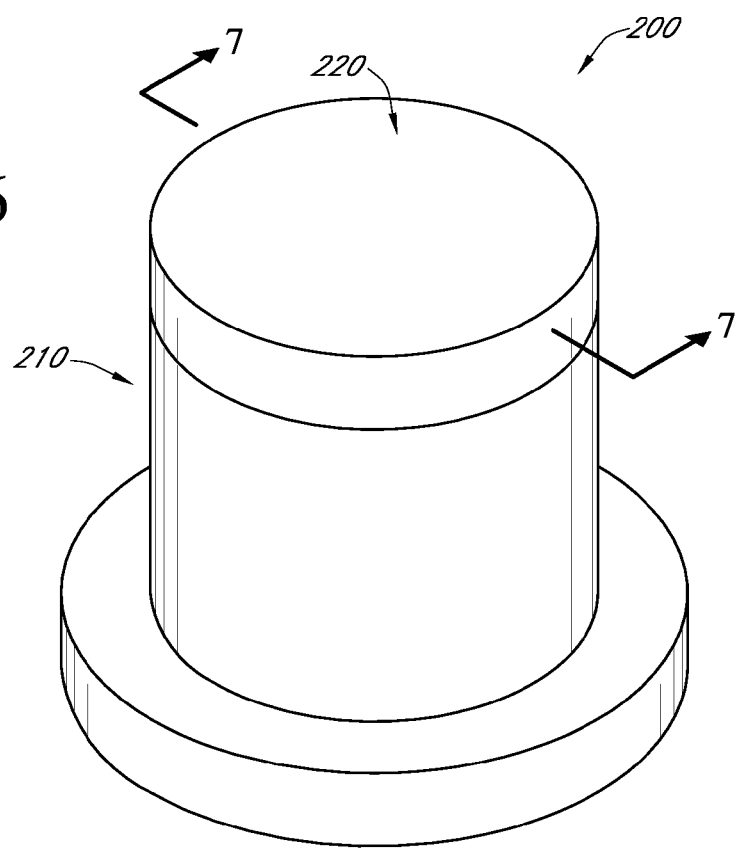
FIG. 6 is a perspective view showing an apparatus for inhibiting glass breakage according to another embodiment of the current invention, with a distal end of the apparatus visible.
Figure 7:
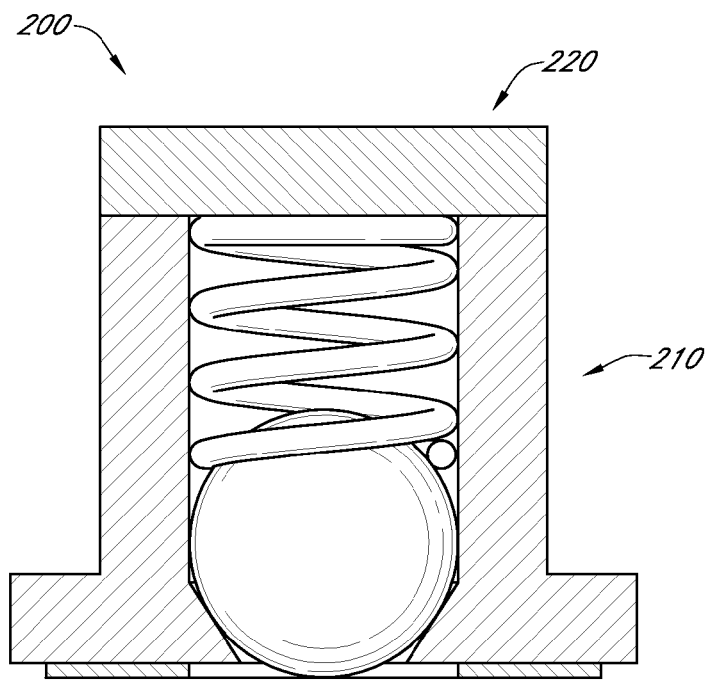
FIG. 7 is a side view of the apparatus of FIG. 6, with various elements shown in section taken along line 7-7 in FIG. 6.
Figure 8:
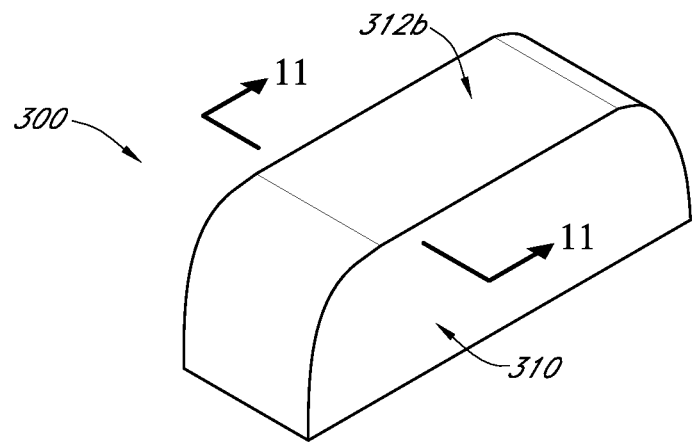
FIG. 8 is a perspective view showing an apparatus for inhibiting glass breakage according to still another embodiment of the current invention, with a distal end of the apparatus visible.

FIGS. 6 and 7 show another apparatus 200 for inhibiting glass breakage that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers between 200 and 299 may be used to indicate parts corresponding to those discussed above numbered between 100 and 199 (e.g., housing 210 corresponds generally to the housing 110), though with any noted or shown deviations.

In embodiment 200, endcap 220 is fused to housing 210. For example, the housing 210 and the endcap 220 may be plastic coupled together through friction welding or ultrasonic welding.

FIGS. 8 through 11 show another apparatus 300 for inhibiting glass breakage that is substantially similar to the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example. For uniformity and brevity, reference numbers between 300 and 399 may be used to indicate parts corresponding to those discussed above numbered between 100 and 199 (e.g., housing 310 corresponds generally to the housing 110), though with any noted or shown deviations.

Figure 9:
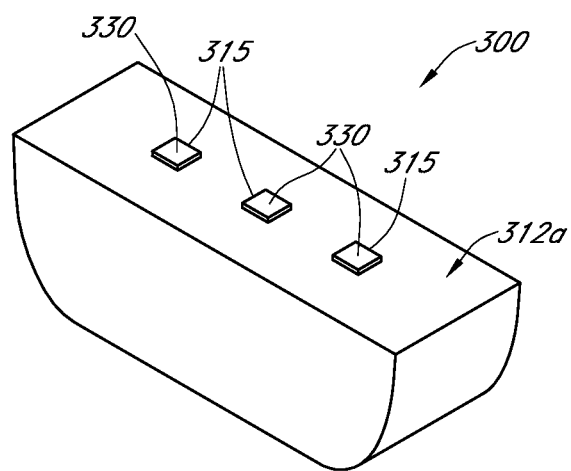
FIG. 9 is a perspective view of the apparatus of FIG. 8, with a proximal (or "contact") end of the apparatus visible.
Figure 10:
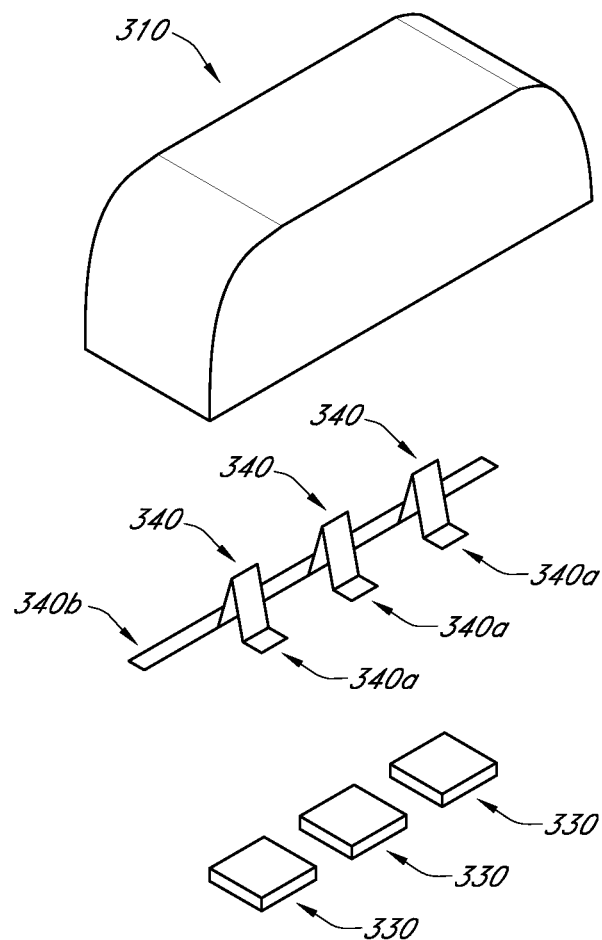
FIG. 10 is an exploded view of the apparatus of FIG. 8, with contact members and biasing members separated from a housing.

In embodiment 300, the housing 310 is sized to contain more than one of the contact members 330. Further, as shown in FIG. 9, the housing contact end 312a has more than one of the apertures 315, and the apparatus 300 may further include at least one cushion 390 (FIG. 11) inside the housing 310 associated with each aperture 315. While embodiment 300 has three rectangular apertures 315, a generally rectangular contact end 312a, and a rounded distal end 312b, the housing 310 can be configured in various ways (as noted regarding the embodiment 100) and may include more or fewer apertures 315 of any appropriate shape to correspond to the contact member(s) 330. And while the drawings show the housing 310 to be a unitary member, it may generally be formed of multiple segments coupled together during a manufacturing process.

The contact members 330 are disposed at least primarily inside the housing 310, with each of the contact members 330 being associated with (and biased toward) a respective aperture 315. The embodiment 300 includes rectangular contact members 330 each having a recess 331 (FIG. 11), and the apertures 315 are smaller than the contact members 330 such that the contact members 330 cannot completely pass through the apertures 315. Such sizing may be particularly desirable when the apparatus 300 is for "aftermarket" use (i.e., when the glass product is not sold with the apparatus 300).

Figure 11:
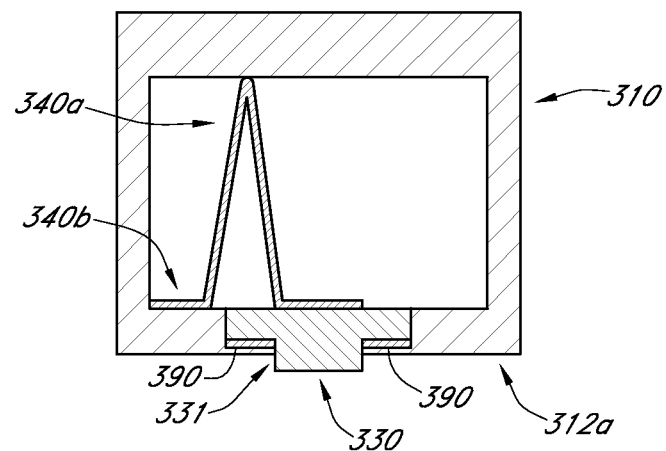
FIG. 11 is a section view of the apparatus of FIG. 8, taken along line 11-11 in FIG. 8.

When multiple contact members 330 are included, they may be biased toward the apertures 315 by a single biasing member 340, or by multiple biasing members 340. The embodiment 300 includes multiple biasing members 340, shown to be flat springs 340a coupled to one another by a rail 340b. More particularly, the embodiment 300 includes a piece of stamped metal bent to define the flat springs 340a. While FIG. 11 shows an upper end of a respective flat spring 340a touching the housing 310, other embodiments employing flat springs 340a may include a spacing between the spring upper ends and the housing 310. And, as discussed above regarding the embodiment 100, other types of biasing members 310 may be used.

Figure 12:
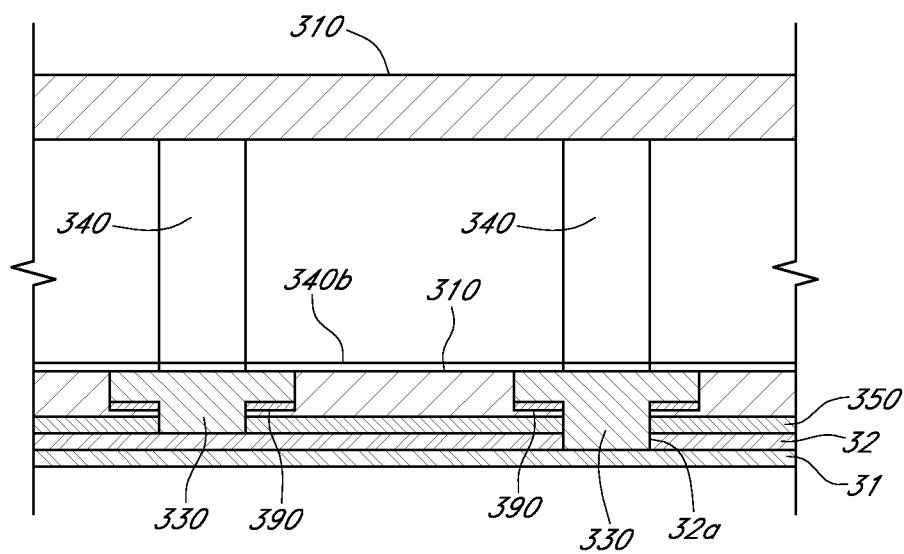
FIG. 12 is a section view of one embodiment of a glass product incorporating the apparatus of FIG. 8.

FIG. 12 shows the apparatus 300 in one method of use, and a resulting glass product. First and second sheets of glass 31, 32 may be spaced apart or laminated together (as shown). Windshield applications, for example, may include lamination; window applications, for example, may include spacing. The second sheet of glass has at least one opening 32a therein, and the contact end 312a of the housing 310 is coupled to at least one of the sheets 31, 32. One of the contact members 330 passes through a respective opening 32a and rests upon the first sheet 31 for receiving an impact force from the first sheet 31. Another of the contact members 330 rests upon the second sheet 32 for receiving an impact force from the second sheet 32. Forces from each sheet 31, 32 are transferred generally as described above regarding FIGS. 1 through 5. By receiving at least a portion of an impact force from the sheet 31, the apparatus 300 may be better able to prevent breakage than if only the sheet 32 were contacted.

FIG. 12a shows the apparatus 300 configured as a ribbon (i.e., with the housing 310 elongated and having a reduced distance between ends 312a, 312b) and positioned between the windshield 10 and an automobile body 2. In such embodiments, the windshield 10 may be directly installed atop the apparatus 300.

Figure 13:
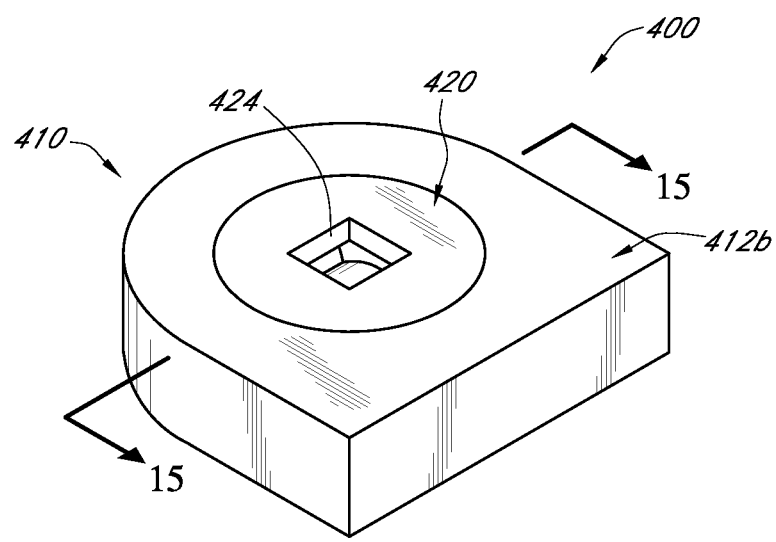
FIG. 13 is a perspective view showing an apparatus for inhibiting glass breakage according to yet another embodiment of the current invention, with a distal end of the apparatus visible.
Figure 14:
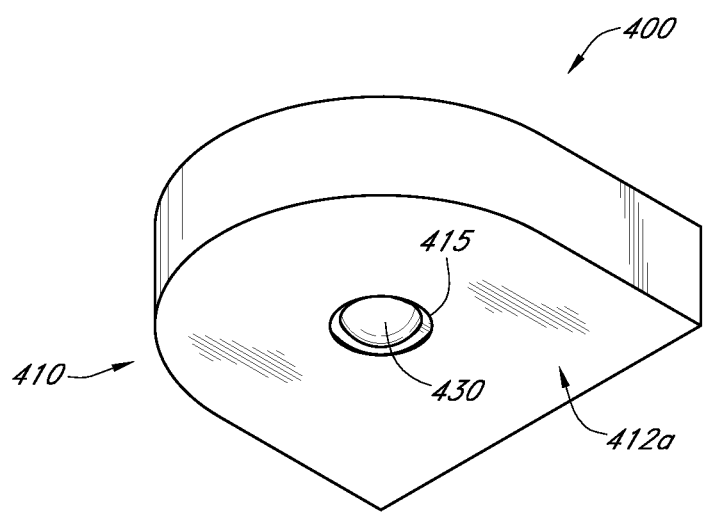
FIG. 14 is a perspective view of the apparatus of FIG. 13, with a proximal (or "contact") end of the apparatus visible.
Figure 15:
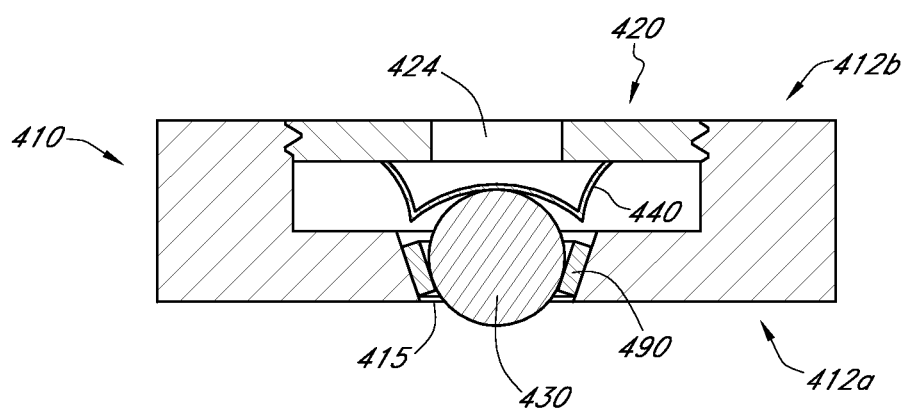
FIG. 15 is a section view of the apparatus of FIG. 13, with various elements shown in section taken along line 15-15 in FIG. 13.

FIGS. 13 through 15 show another apparatus 400 for inhibiting glass breakage that is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example. For uniformity and brevity, reference numbers between 400 and 499 may be used to indicate parts corresponding to those discussed above numbered between 100 and 199 (e.g., housing 410 corresponds generally to the housing 110), though with any noted or shown deviations.

In embodiment 400, the housing 410 is configured as a rear view mirror mount, such that the housing 410 may be coupled to a windshield and a rear view mirror may in turn be coupled to the housing 410. While it may be particularly desirable for the housing 410 to be constructed of metal, other materials (e.g., plastic, ceramic, or glass) may alternately be used. The biasing member 440 shown in FIG. 15 is another type of flat spring. But, as noted above, other types of biasing members may be used.

Figure 16:
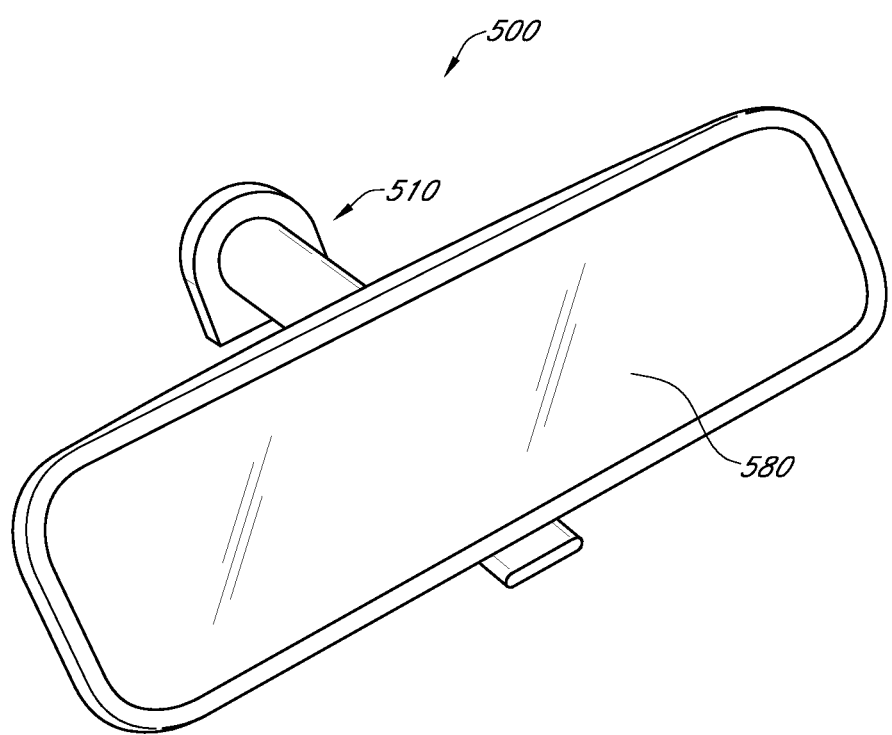
FIG. 16 is a perspective view showing an apparatus for inhibiting glass breakage according to still yet another embodiment of the current invention.
Figure 17:
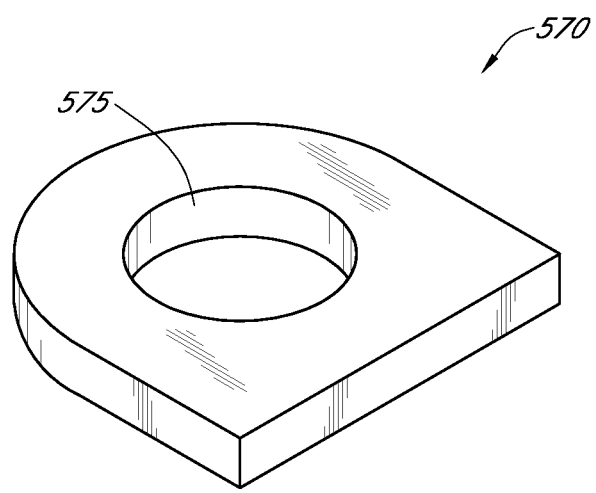
FIG. 17 is a perspective view showing a mount of the apparatus of FIG. 16.
Figure 18:
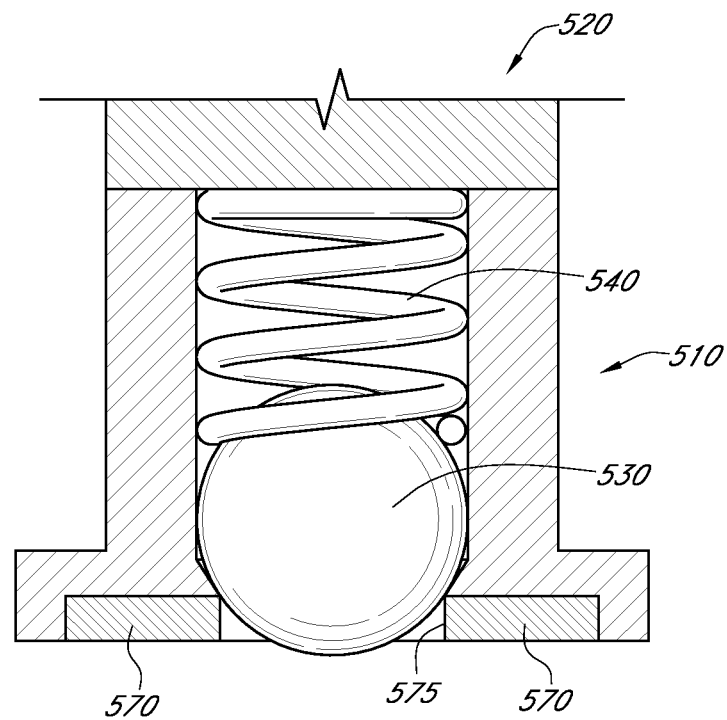
FIG. 18 is a section view of part of the apparatus of FIG. 16, with various elements shown in section.

FIGS. 16 through 18 show another apparatus 500 for inhibiting glass breakage that is substantially similar to the embodiment 100, except as specifically noted and/or shown, or as would be inherent. Further, those skilled in the art will appreciate that the embodiment 100 (and thus the embodiment 500) may be modified in various ways, such as through incorporating all or part of any of the various described embodiments, for example. For uniformity and brevity, reference numbers between 500 and 599 may be used to indicate parts corresponding to those discussed above numbered between 100 and 199 (e.g., housing 510 corresponds generally to the housing 110), though with any noted or shown deviations.

In embodiment 500, the housing 510 is configured to attach to a rear view mirror mount 570, such that the housing 510 overlays the mount 570 for example. And in the embodiment 500, endcap 520 is shown fused to the housing 510. The endcap 520 may extend to a mirror portion 580, and a ball and socket joint or other structure may be utilized to allow positioning of the mirror portion 580 to be easily adjusted. In other embodiments, the housing 510 may extend to the mirror portion 580 (with any adjustment elements included), and other structure (e.g., set screws or removable plates) may be used to support the biasing member 540. A cushion corresponding to the cushion 190 may of course be included in the housing 510.

In use, the mount 570 is coupled to a windshield, and the housing 510 is coupled to the mount 570 such that the contact member 530 passes through a hole 575 in the mount 570 and rests on the windshield. Force transfer may occur generally as set forth above to inhibit glass breakage, and the mirror portion 580 may be used in a traditional manner to improve a user's view.

Figure 19:
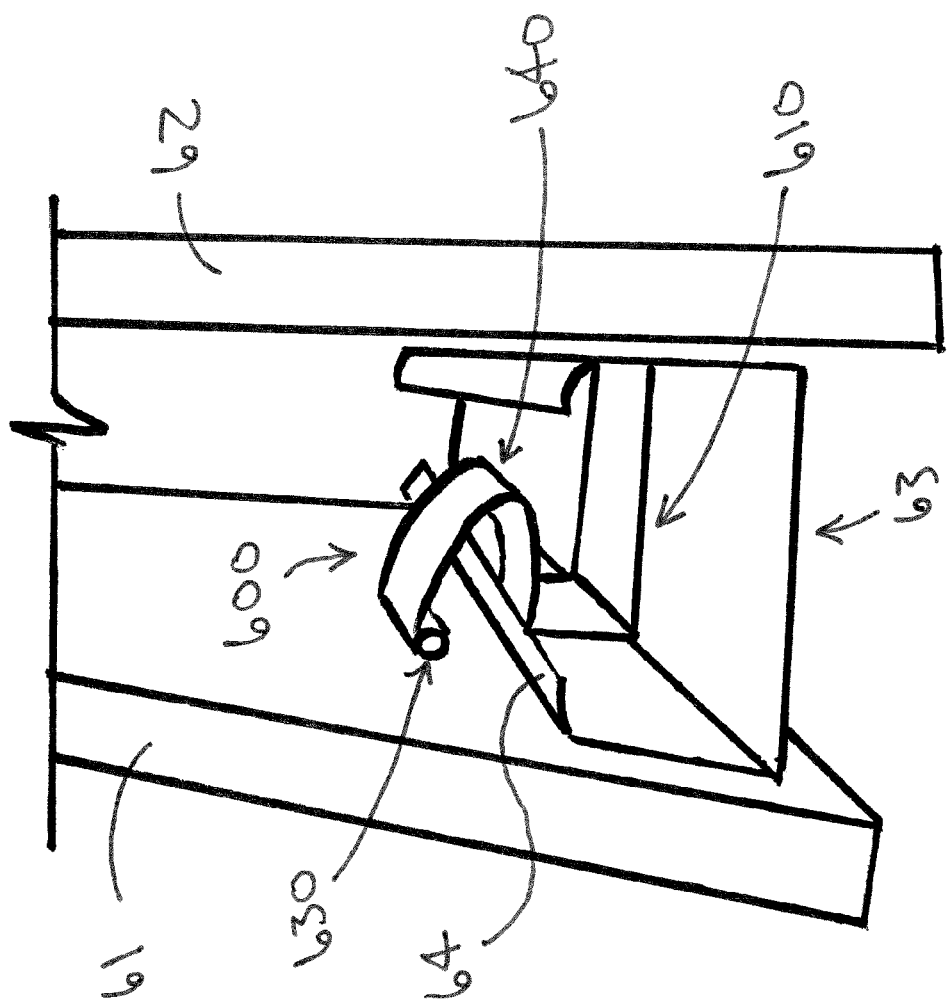
FIG. 19 is a perspective view of an apparatus for inhibiting glass breakage and a resulting glass product according to a further embodiment of the current invention.
Figure 20:
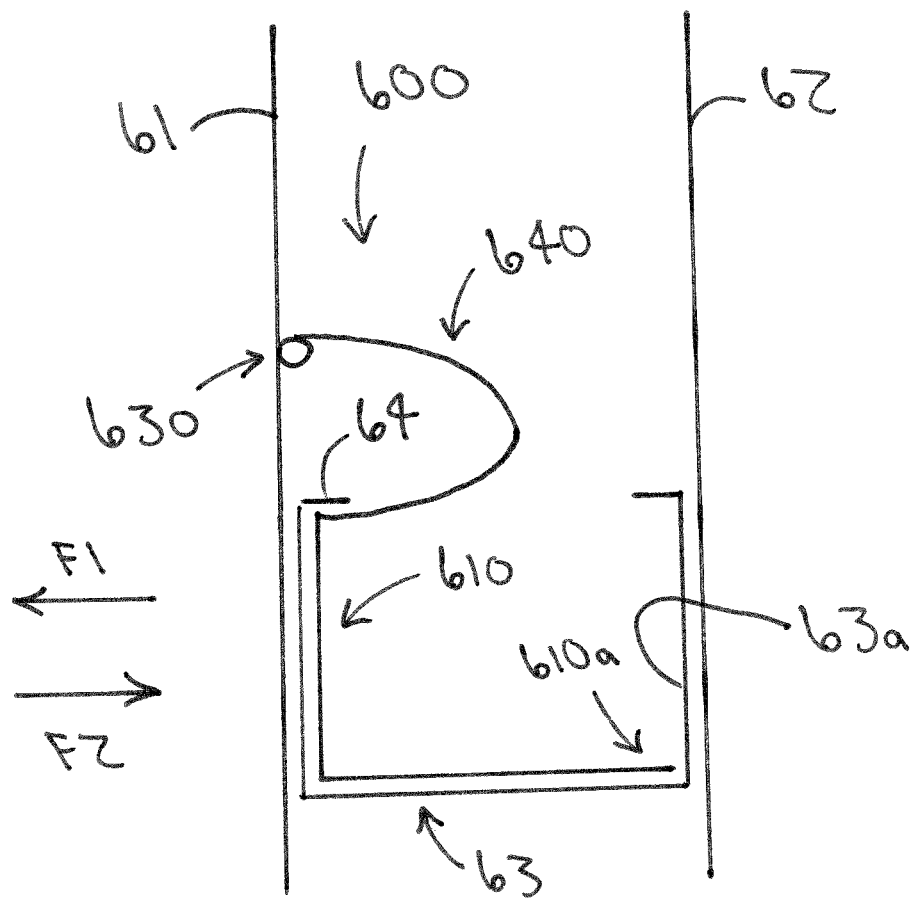
FIG. 20 is a side view of the apparatus and resulting glass product of FIG. 19.

FIGS. 19-20 show another apparatus 600 for inhibiting glass breakage in one method of use, and a resulting glass product. First and second sheets of glass 61, 62 are spaced apart by a spacer 63 that includes a ledge 64. A bonding agent (not shown) may couple the spacer 63 to the glass 61, 62. The apparatus 600 includes a base portion 610, a contact member 630, and a biasing member 640. In some embodiments, the base portion 610, the contact member 630, and the biasing member 640 are all made of a continuous, unitary material (e.g., resilient metal, resilient plastic, et cetera), either with or without an overlying coating; in other embodiments, one or more of the portions 610, 630, 640 are formed separately and coupled to the other portions (e.g., by adhesive, welding, et cetera). The base portion 610 is configured to interact with the ledge 64 to maintain the base portion 610 stationary relative to the glass 61, 62 and the spacer 63. Adhesive or other fastening methods may or may not be used to further fix the base portion 610 to the spacer 63, and distal end 610a of the base portion 610 may or may not extend to spacer face 63a.

Continuing, the contact member 630 abuts the glass 61, and the biasing member 640 biases the contact member 630 toward the glass 61. As shown in FIGS. 19-20, it may be desirable for the contact member 630 to be generally round to provide a single point of contact between the contact member 630 and the glass 61. Nevertheless, the contact member 630 may be configured to be shaped differently. As with the contact member 130 described above, rubber and glass may also be suitable materials for the contact member 630. Rubberized coatings on resilient or non-resilient materials may further be acceptable. The apparatus 600 in FIGS. 19-20 is formed of a unitary sheet of material bent to define the base portion 610, the contact member 630, and the biasing member 640, and one end of the sheet is rolled to define the contact member 630.

The biasing member 640 specifically causes the contact member 630 to impart a first force in direction F1 on the glass 61, and the system may remain in this configuration until the glass 61 receives an impact force in direction F2 (e.g., imparted by flying debris). Upon receipt of the impact force F2, the glass 61 may transfer at least a portion of the impact force F2 to the contact member 630, which in turn may transfer force to the biasing member 640. The biasing member 640 may then return part of the force F2 to the glass 61 via the contact member 630. In some embodiments, the contact member 630 may move from the glass 61 upon receiving the portion of the impact force F2.

Inefficiencies in the biasing member 640, for example, may cause less than the full amount of force transferred to the contact member 630 from the glass 61 to be returned to the glass 61. This may be particularly advantageous if multiple apparatus 600 are used with the glass 61. In addition, if multiple apparatus 600 are used with the glass 61, the timing of the force transfer may vary slightly between the different apparatus 600, allowing forces to be transferred back to the glass 61 at different times. The glass 61 may be able to withstand this staggered return of forces better than the impact force F2 if the multiple apparatus 600 were not utilized.

To further dissipate the impact force F2, a cushion may be coupled to the contact member 630 (e.g., using adhesive or other appropriate fastening devices and methods). In such embodiments, the cushion may be initially compressed when the contact member 630 contacts the glass 61. Upon movement of the contact member 630 away from the glass 61, the cushion may expand. The cushion may then absorb some force from the contact member 630 when the contact member 630 is returned to the glass 61, causing the cushion to return to the compressed configuration. The cushion may be constructed of, for example, open celled polyurethane, and a fast-recovery memory foam may be particularly useful. Those skilled in the art will appreciate that other materials which may quickly return to their original configuration after being compressed may similarly be used.

Figure 21:
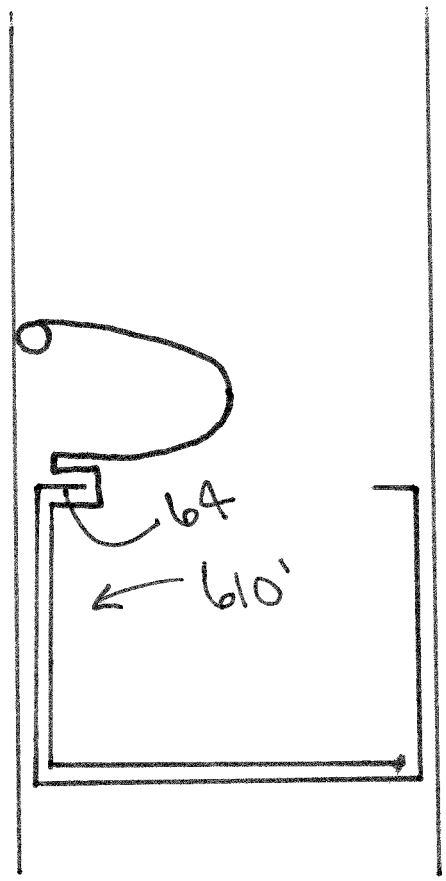
FIG. 21 shows an alternate base portion for use in the apparatus of FIG. 19.

FIG. 21 shows an alternate base portion 610' for use in the apparatus 600. The alternate base portion 610' illustrates that various configurations may be appropriate for interacting with the ledge 64.

FIG. 22 shows the apparatus 600 for inhibiting glass breakage and a resulting glass product (slightly exploded) that is substantially similar to as described above regarding embodiment 600, except as specifically noted and/or shown, or as would be inherent. In FIG. 22, the spacer 63 is not present (or at least not utilized). As such, the base portion 610 extends in a pressure fit between glass sheets 61, 62. Adhesive or other fastening methods may or may not be used to further fix the base portion 610 to the glass 61, 62.

FIG. 22a shows another alternate base portion 610" for use in the apparatus 600. Here, alternate base portion 610" is coupled to the glass sheet 61 (e.g., by adhesive). The alternate base portion 610" illustrates that various base configurations may be appropriate for interacting with the glass 61, 62 (or the spacer 63).

Figure 23:
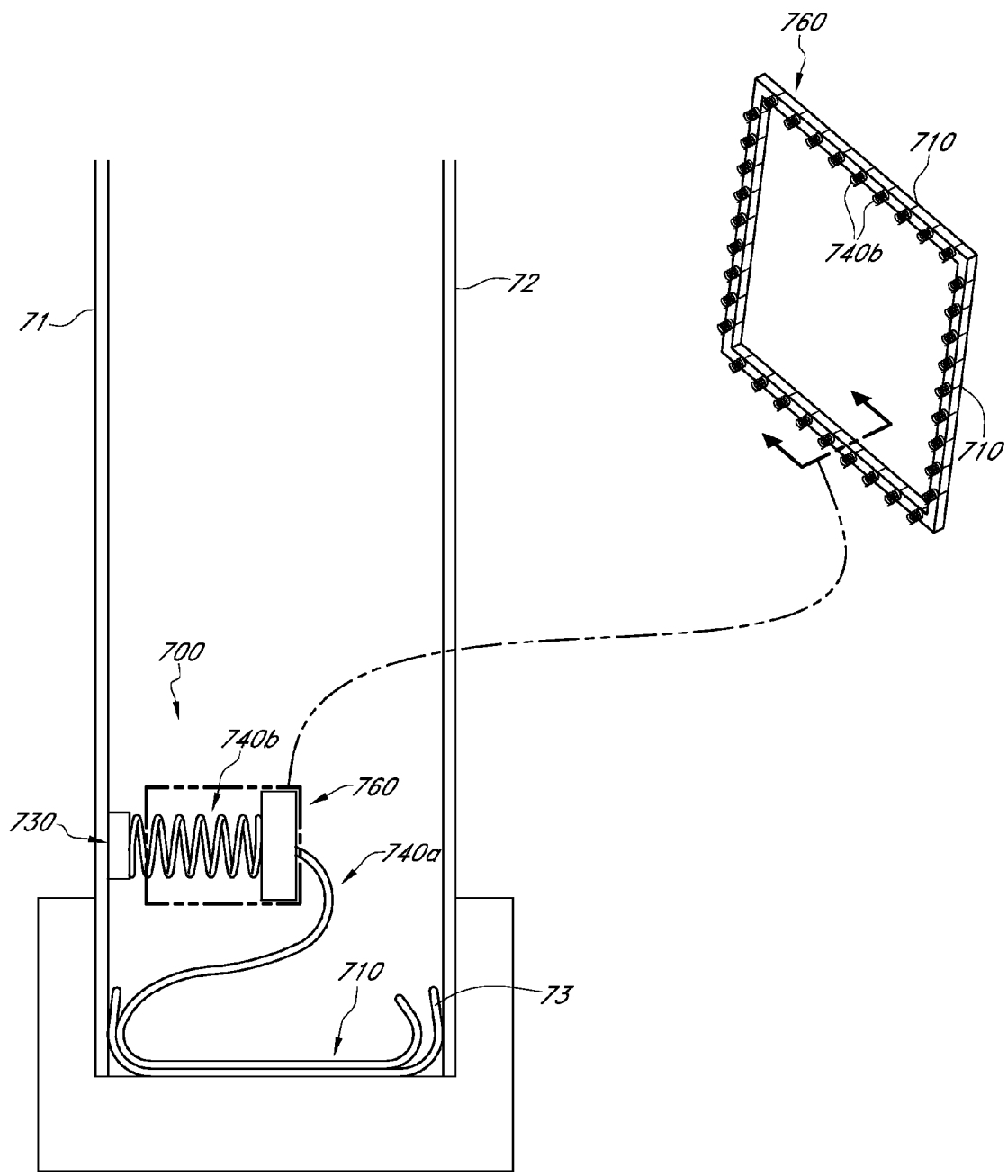
FIG. 23 is a perspective view of an apparatus for inhibiting glass breakage and a resulting glass product according to still yet another embodiment of the current invention.

FIG. 23 shows another apparatus 700 for inhibiting glass breakage in one method of use that is substantially similar to embodiment 600, except as specifically noted and/or shown, or as would be inherent. Further, those skilled in the art will appreciate that the embodiment 700 (and thus the embodiment 600) may be modified in various ways, such as through incorporating all or part of any of the various described embodiments, for example. For uniformity and brevity, reference numbers between 700 and 799 may be used to indicate parts corresponding to those discussed above numbered 600-699 (e.g, contact member 630 corresponds generally to contact member 730) though with any noted or shown deviations. In an embodiment, the apparatus 700 includes a base portion 710, a contact member 730, a first biasing member 740a, a second biasing member 740b, and a rail 760.

The rail 760 may be a piece of material extending around the perimeter of a window frame between a first sheet of glass 71 and a second sheet of glass 72 or may be, for example, a grid pattern visible through the glass 71, 72. The first and second sheets of glass 71, 72 may be spaced apart by a spacer 73. The base portion 710 may, for example, fit snugly within the spacer 73 between the first and second sheets of glass 71, 72. The first biasing member 740a abuts the rail 760. The second biasing member 740b extends from the rail 760 to the contact member 730, and the contact member 730 abuts the first sheet of glass 71. The first biasing member 740a biases against the rail 760, which supports the second biasing member 740b, which biases the contact member 730 toward the glass 71.

When a force is received against the first sheet of glass 71, at least a portion of the force is transferred to the contact member 730. The contact member 730 pushes against the second biasing member 740b which causes temporary deformation of the second biasing member 740b as it pushes against the rail 760 and may allow the contact member 730 to separate from the glass 71. If the force upon the first sheet of glass 71 is great enough, then the force transferred to the rail 760 by the second biasing member 740b may be sufficient to cause temporary deformation of the first biasing member 740a and movement of the rail 760. The first biasing member 740a, the rail 760, the second biasing member 740b, and the contact member 730 may eventually each return to their initial positions. As described above, cushions may be used (e.g., with the contact member 730), and the amount of force transferred back to the first sheet of glass 71 may be less than the force initially received. Additionally, as set forth in FIG. 23, multiple base portions 710, biasing members 740a, 740b, and contact members 730 may be associated with the rail 760.

FIGS. 24-30 show alternative embodiments of various apparatus incorporating sensors 1000 as part of the apparatus. The sensors 1000 may, for example, be enabled to detect movement of a surface in response to a force acting upon a surface, and to cause an alert to be activated.

Figure 24:
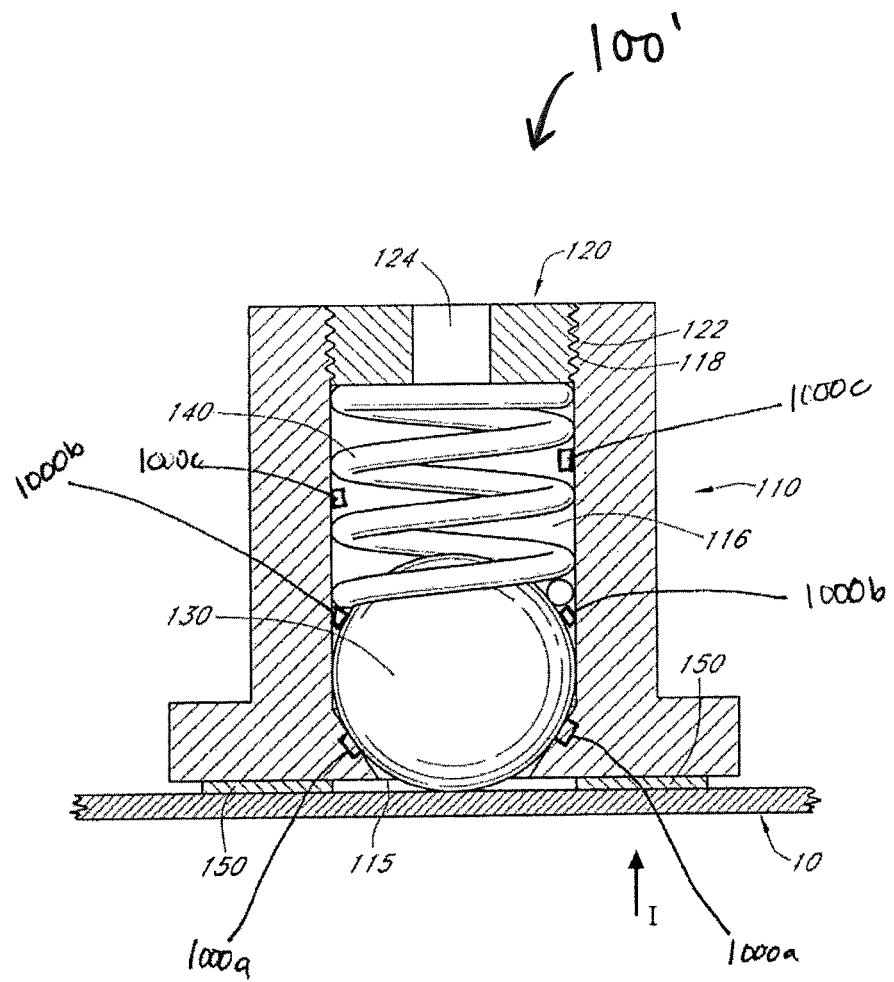
FIG. 24 is a side view of the apparatus of FIG. 1 in use, with various elements shown in section taken along line 3-3 in FIG. 1, and incorporating sensors.
Figure 25:
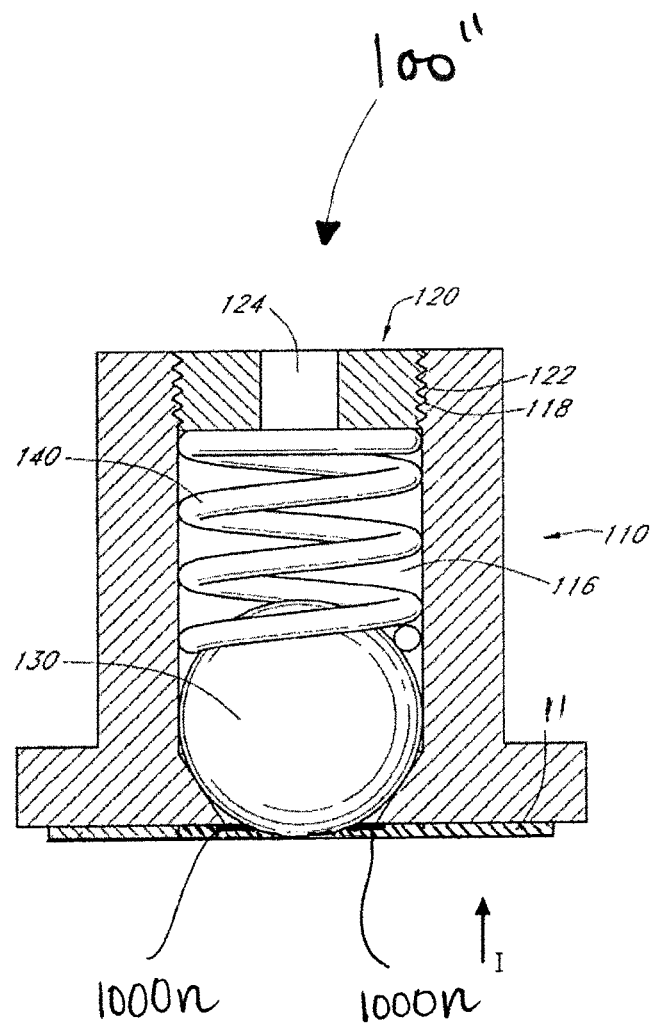
FIG. 25 is a side view of the apparatus of FIG. 6, taken along line 7-7 in FIG. 6 and further incorporating sensors.

FIGS. 24 and 25 show apparatus 100', 100" that are substantially similar to embodiment 100, except as specifically noted and/or shown, or as would be inherent. In FIG. 24, sensors 1000 are placed at various locations inside the housing 110 such that a force acting upon the sheet of glass 10 would trigger an alert. For example, sensors 1000a may be disposed along the walls of the housing 110 forming the cavity 116. The contact member 130 may be in constant contact with the sensors 1000a. When a force I acts upon the sheet of glass 10, the contact member 130 may be forced away from the sheet of glass 10. When the contact member 130 loses contact with the sensors 1000a, the sensors 1000a may recognize that the force I caused the contact member 130 to shift off of the sensors 1000a, thus triggering an alert. Alternately, the sensors 1000 can be placed along the walls of the housing 110 near the upper edge of the contact member 130, as shown at 1000b. When the force I causes the contact member 130 to shift, the contact member 130 encounters the sensors 1000b, thus triggering an alert. In another alternative, sensors 1000 may be placed along the walls of the housing 110 between coils in a biasing member 140 (which is a helical spring in FIG. 24), as shown at 1000c. When a force I acts upon the sheet of glass 10, the contact member 130 is pushed against the spring 140, and causing the coils to contract. As the coils contract, one or more of the coils may come into contact with the sensors 1000c, thus triggering an alert. As shown in FIG. 25, the sensors 1000n may alternately be located along a contact end 11, wherein the contact member 130 sits atop the contact end 11 and is in constant contact with the sensors 1000n. When a force is applied to the contact end 11, the contact member 130 loses contact with the sensors 1000n, thus triggering an alert.

Figure 26:
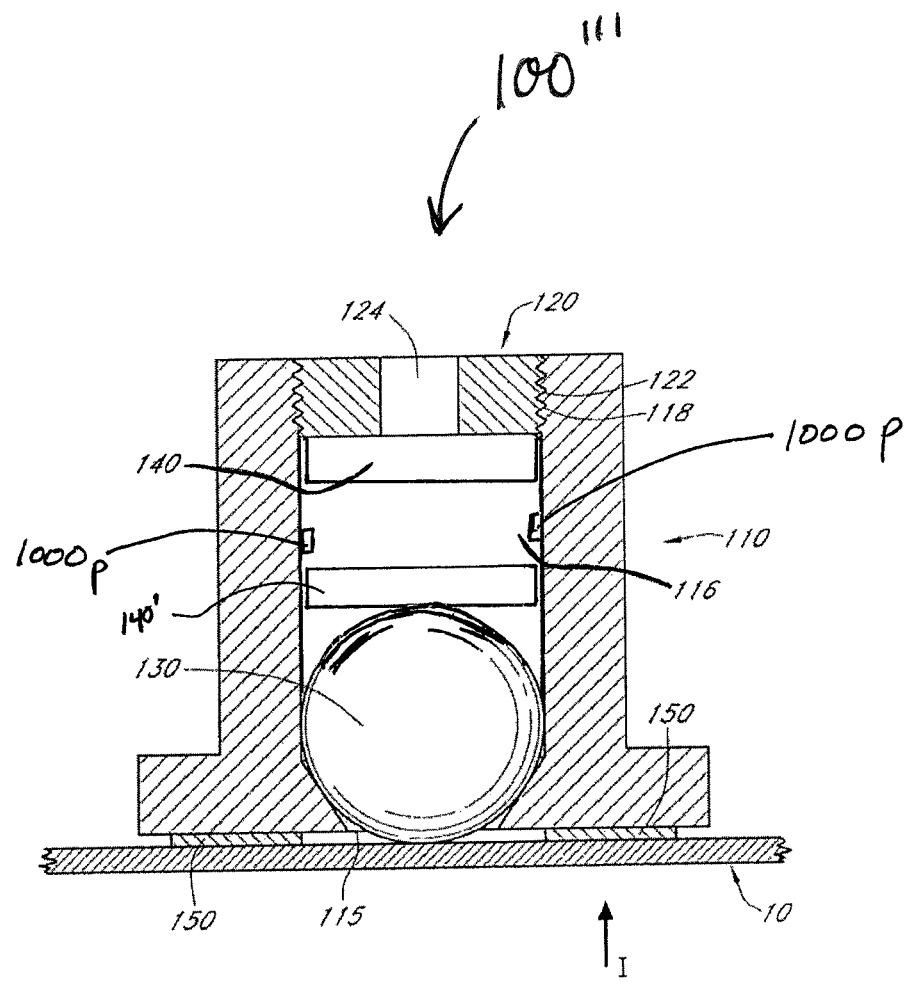
FIG. 26 is a side view of the apparatus of FIG. 1, taken along line 3-3 in FIG. 1, showing a magnetic spring and further incorporating sensors.

FIG. 26 shows an apparatus 100''' that is substantially similar to the embodiments described above with reference to FIGS. 24-25, except as specifically noted and/or shown, or as would be inherent. The difference between embodiment 100''' and those shown in FIGS. 24-25 is that the spring 140 in FIG. 26 is a magnetic spring rather than a helical spring. The sensors 1000p in FIG. 26 are shown in the cavity 116 of the housing 110. When a force is received upon the sheet of glass 10, the contact member 130 causes the magnet 140' to shift upwards. The magnet 140' may come into contact with the sensors 1000p, thus triggering an alert.

Figure 27:
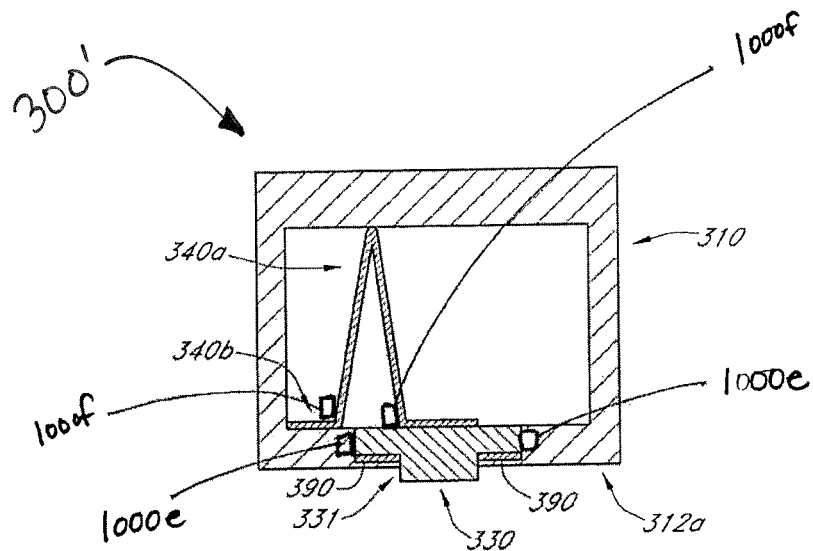
FIG. 27 is a section view of the apparatus of FIG. 8, taken along line 11-11 in FIG. 8, and further incorporating sensors.
Figure 28:
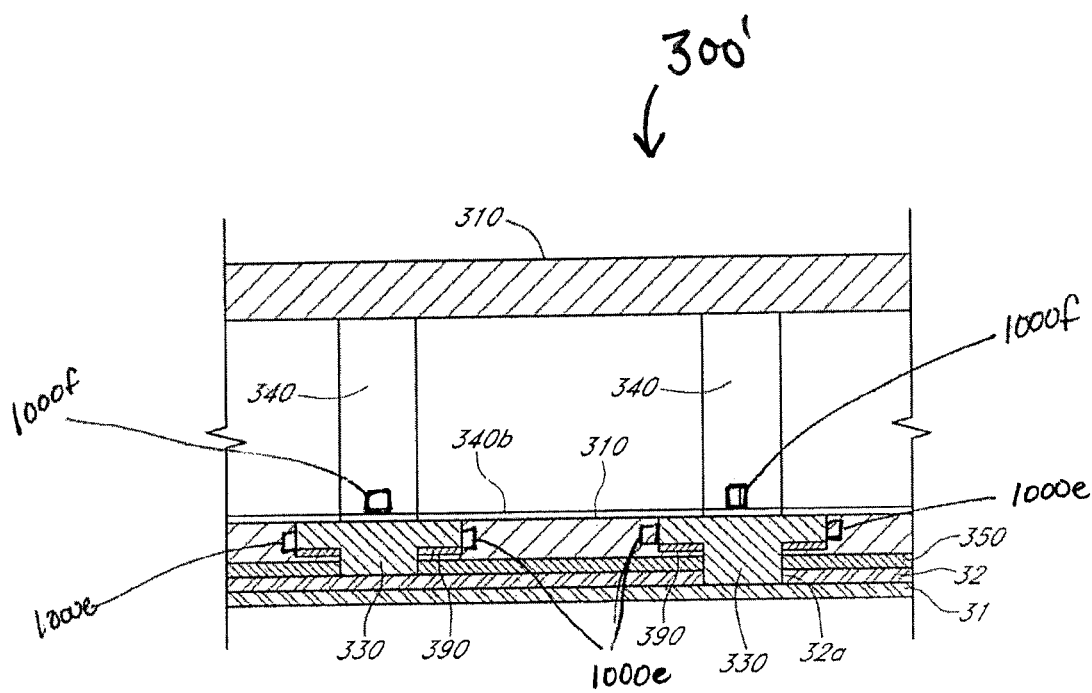
FIG. 28 is a section view of one embodiment of a glass product incorporating the apparatus of FIG. 8 and further incorporating sensors.

FIGS. 27 and 28 show an apparatus 300' that is substantially similar to embodiment 300, except as specifically noted and/or shown, or as would be inherent. Sensors 1000 may be located, for example, along the edges of the biasing member 340, as shown at 1000e. Alternately, sensors may be placed at various places on the biasing member 1000f such that movement of the biasing member triggers the sensors 1000 to initiate an alert.

Figure 29:
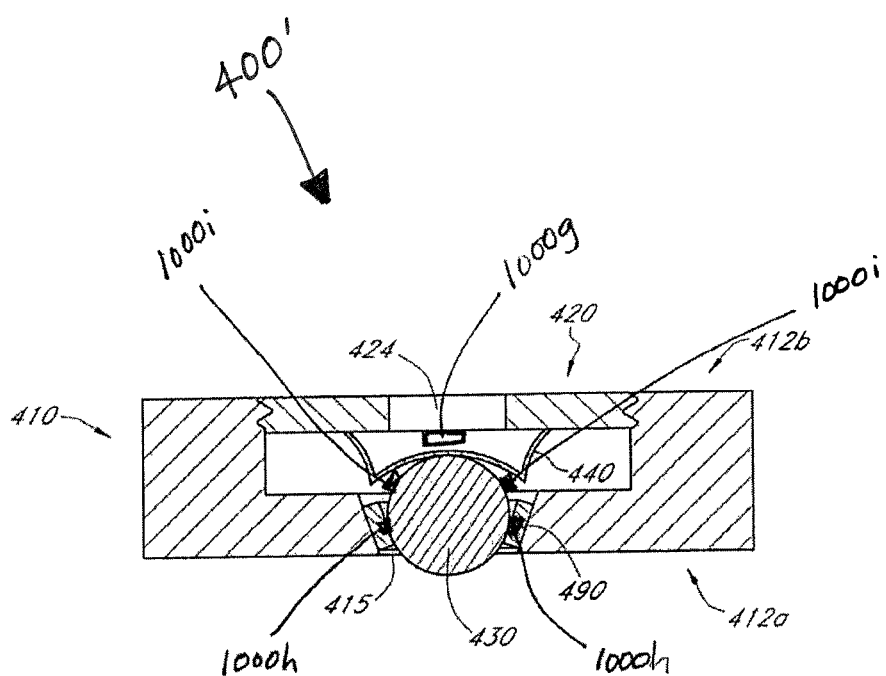
FIG. 29 is a section view of the apparatus of FIG. 13, with various elements shown in section taken along line 15-15 in FIG. 13, and further incorporating sensors.

FIG. 29 shows an apparatus 400' that is substantially similar to embodiment 400, except as specifically noted and/or shown, or as would be inherent. Sensors 1000 may be secured, for example, behind the biasing member 440, as shown at 1000g, such that movement of the contact member 430 causes the biasing member 440 to contact the sensor 1000g, thus triggering an alert. Alternately, the sensors may be located within the cushions 490 (as shown at 1000h), such that movement of the contact member 430 away from the cushion 490, or a return of the contact member 490 to the cushion 490 after a force has been received, activates the sensor 1000h. In another alternative, the sensors 1000 can be placed along the walls of the housing 410 near the upper edge of the contact member 430, as shown at 1000i. When the force I causes the contact member 430 to shift, the contact member 430 encounters the sensors 1000i, thus triggering an alert.

Figure 30:
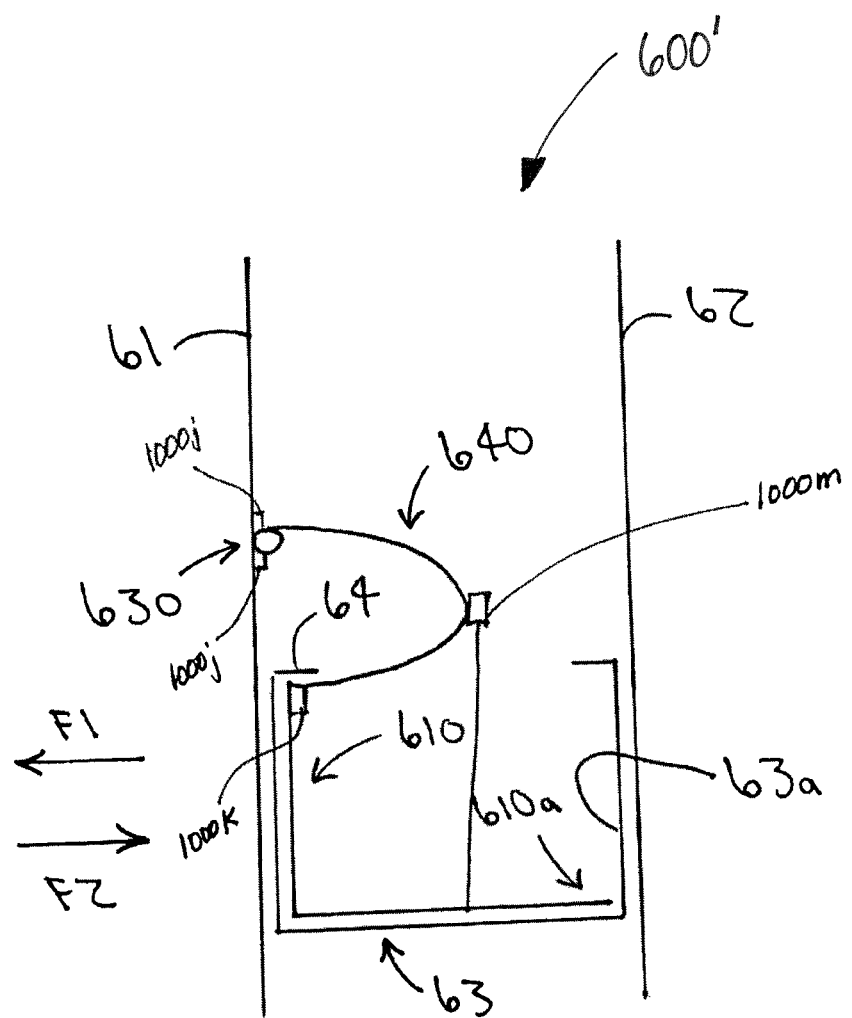
FIG. 30 is a side view of the apparatus of FIG. 19 further incorporating sensors.

FIG. 30 shows an apparatus 600' that is substantially similar to embodiment 600, except as specifically noted and/or shown, or as would be inherent. Sensors 1000 may be provided, for example, near where the contact member 630 rests upon the glass 61, as shown at 1000j, such that a force F2 received upon the glass 61 causes the contact member 630 to shift away from the glass 61, triggering the sensors 1000j. Alternately, the sensor may be located at the junction between the biasing member 640 and the base member 610, as shown at 1000k. When a force is received upon the surface of the glass 61, the biasing member 630 may be pushed away from the surface of the glass 61, thus engaging the sensor 1000k. In another alternative, a sensor 1000 may be supported behind the biasing member 640, as shown at 1000m. Again, a force F2 received upon the surface of the glass 61 causes the biasing member to shift, thus triggering the sensor 1000m.

It shall be understood that examples depicted in FIGS. 24-30 and described herein are exemplary only, and that the sensor(s) 1000 may be placed in any appropriate location such that movement of the biasing member caused by an impact force would cause the sensor 1000 to trigger an alert. Further, multiple sensors 1000 may be incorporated in an embodiment, and filtering criteria may be used to determine when to activate an alert. For example, an alert may be initiated only after two sensors 1000 detect movement. Additionally, the sensors 1000 may be able to detect the amount of force exerted upon the surface of the glass 61 (or other surface). For example, multiple sensors 1000 may be located at various points within or along the housing 110. The amount of force exerted upon the contact surface may be determined by which sensor(s) 1000 are activated by movement of the contact member 130. The amount of force required to reach each sensor 1000 may be already known, such that if the contact member 130 contacts a first sensor 1000 along the walls of the housing 110 but not a second sensor located further from the contact member 130, the amount of force will be generally known. Alternately, the sensor(s) 1000 may be able to measure the amount of force exerted upon the contact surface and to report that information to a user.

Figure 31:
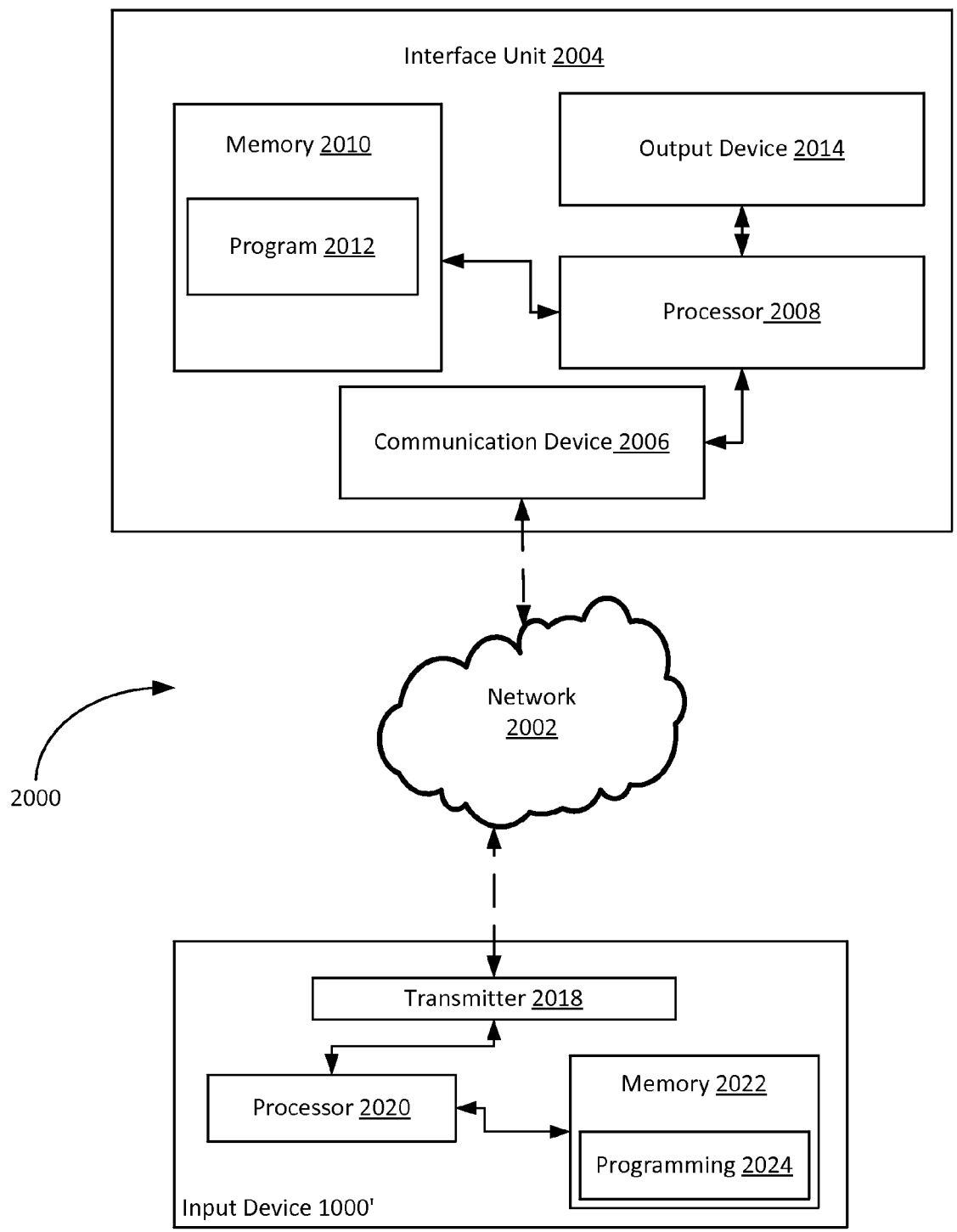
FIG. 31 is a block diagram of a system according to one embodiment of the current invention.

FIG. 31 illustrates a system 2000 incorporating apparatus for dispersing impact forces. The system 2000 may include an interface unit 2004 and a sensor 1000' in data communication over a network 2002. The interface unit 2004 may include a communication device 2006, a processor 2008, an output device 2014, and non-transitory computer memory 2010 having programming 2012.

The output device 2014 may be any appropriate device, whether now existing or later developed, for presenting data from the processor 2008. This may include, for example, one or more of: a printer, a monitor, a keyboard, a computer mouse, a touchpad, a speaker, a buzzer, a light, et cetera. The communication device 2006 may be any device, whether now known or later developed, that allows the system 2000 to communicate with the network 2002. For example, the communication device 2006 may be a switch, wireless router, wired modem, et cetera. The network 2002 may be the World Wide Web, a private or local network, or a cellular network, for example.

The interface unit 2004 may be, for example, a computer or smart phone associated with a monitoring system. Alternately, the interface unit 2004 may be a home alarm that alerts the homeowner that a force has been received upon a surface having an apparatus attached thereto.

The sensor 1000', as described above regarding the sensors 1000, may be located in or on various apparatus for dispersing impact forces. The sensor 1000' may include a transmitter 2018, a processor 2020, and non-transitory memory 2022 having programming 2024. Optionally, the processor 2020, memory 2022, and programming 2024 may be separate from the sensor 1000'.

Figure 32:
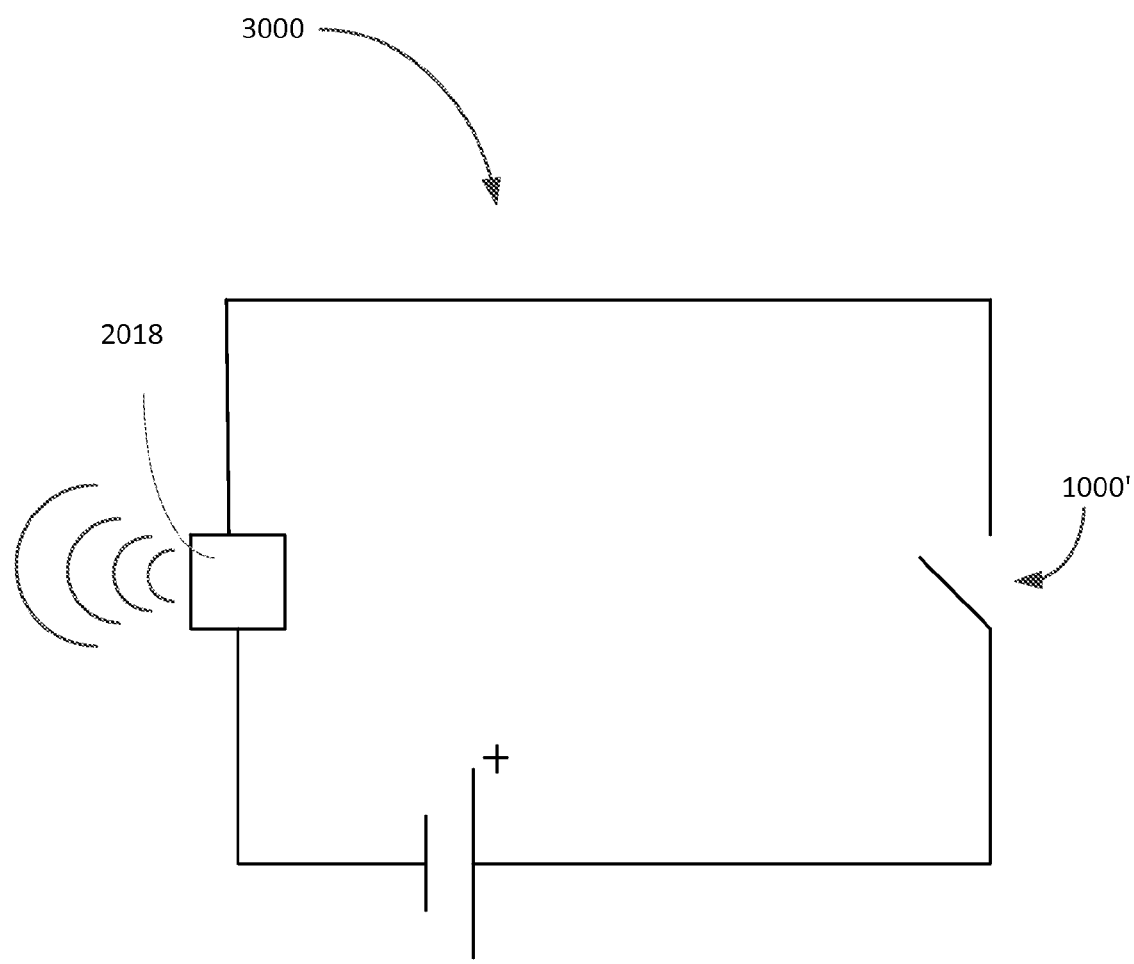
FIG. 32 is a circuit diagram of an input device as shown in FIG. 31.
Figure 33:
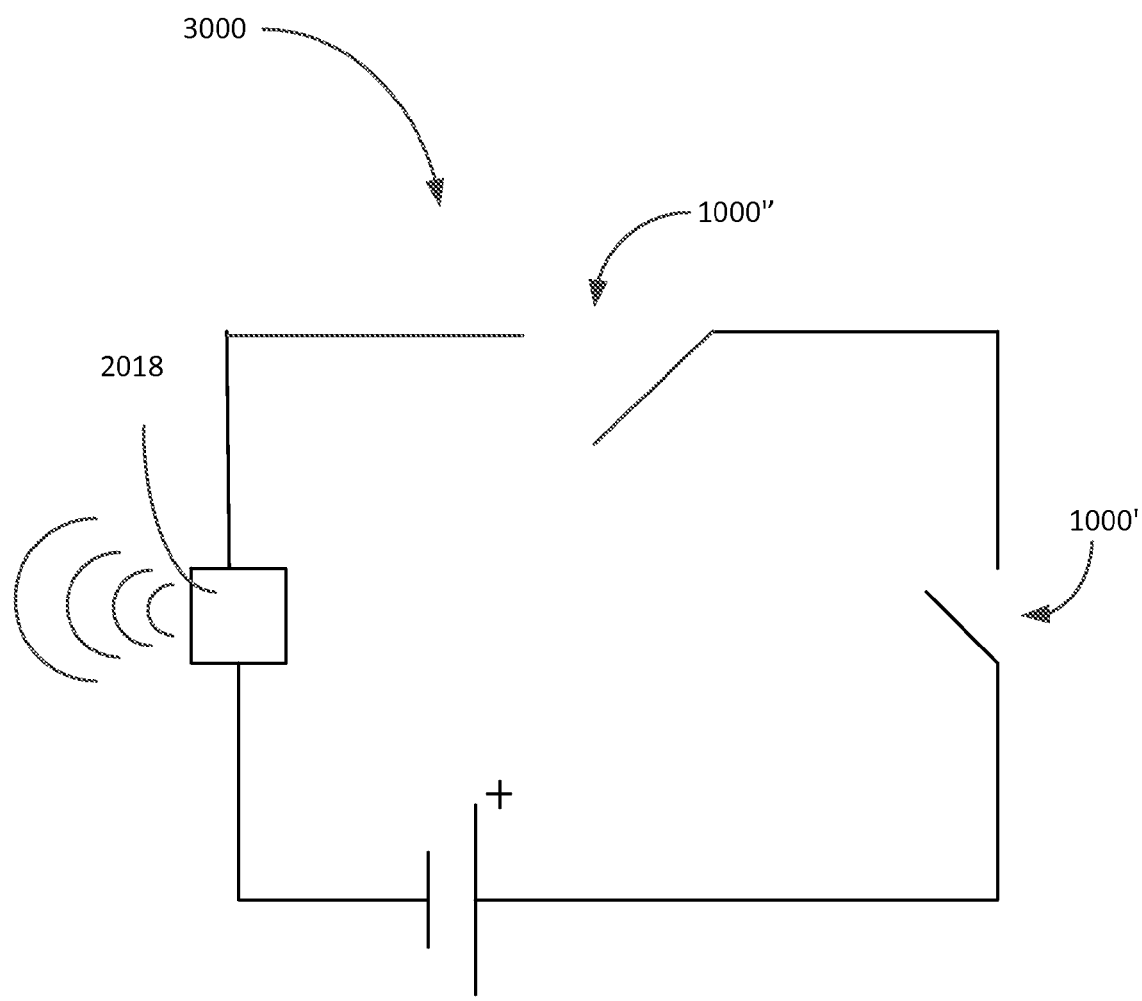
FIG. 33 is a circuit diagram of an input device as shown in FIG. 31 showing two switches.

In use, a force is received upon an impact surface, causing a contact member in an apparatus for dispersing impact forces (such as those described in embodiments 100', 100", 100''', 300', 400', and 600') to shift. The shift in the contact member to (or away from) the sensor 1000' may complete a circuit 3000 shown in FIG. 32, as generally described above regarding sensing in FIGS. 24-30, and the transmitter 2018 may send an alert. In another alternative (FIG. 33), the contact member may be required to activate (e.g., shift away from) a first sensor 1000 and also activate (e.g., contact) a second sensor 1000" before the transmitter 2018 emits an alert to the interface unit 2004.

Once an alert has been sent via the transmitter 2018, the processor 2008 may then recognize the signal and cause the output device 2014 to alert the user that the sensor 1000' has been triggered.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

I claim:

1. An apparatus for dispersing impact forces, comprising:
   a housing having a contact end with an aperture;
   a contact member located at least primarily inside the housing;
   a biasing member biasing the contact member toward the housing aperture;
   a sensor; and
   means for securing the housing contact end to an impact receiving surface;
   wherein the sensor initiates an alert when an impact force received on the impact receiving surface causes the contact member to shift a predetermined distance from an initial position.

2. The apparatus of claim 1, wherein the sensor is disposed substantially adjacent the contact member when the contact member is at the initial position.

3. The apparatus of claim 2, wherein the contact member is maintained in constant contact with the sensor at the initial position, and wherein the sensor initiates an alert when an impact force received on the impact receiving surface causes the contact member to lose contact with the sensor.

4. The apparatus of claim 2, wherein the contact member does not contact the sensor when at the initial position, and wherein the sensor initiates an alert when an impact force received on the impact receiving surface causes the contact member to contact the sensor.

5. The apparatus of claim 1, wherein the sensor is disposed inside a cavity defined by the housing, and wherein the sensor initiates the alert when the impact force received on the impact receiving surface causes the contact member to shift from the initial position, the shifting of the contact member from the initial position imparting a force on the biasing member.

6. The apparatus of claim 5, wherein the sensor initiates the alert when the shift of the contact member causes the biasing member to come into contact with the sensor.

7. The apparatus of claim 5, wherein the sensor initiates the alert when the shift of the contact member causes the biasing member to lose contact with the sensor.

8. The apparatus of claim 1, wherein the sensor is disposed along a contact end, wherein the contact member sits atop the contact end and is in constant contact with the sensor, and wherein the sensor initiates the alert when the impact force received upon the impact receiving surface causes the contact member to lose contact with the sensor.

9. An apparatus for dispersing impact forces, comprising:
   a base;
   a contact member for contacting an impact receiving surface;
   a biasing member disposed between the base and the contact member; and
   a sensor;
   wherein the biasing member biases the contact member toward an initial position at the impact receiving surface; and
   wherein the sensor initiates an alert when an impact force received on the impact receiving surface causes the contact member to shift from an initial position.

10. The apparatus of claim 9, wherein the sensor is disposed substantially adjacent the contact member when the contact member is at the initial position.

11. The apparatus of claim 10, wherein the contact member is maintained in constant contact with the sensor when at the initial position, and wherein the sensor initiates an alert when an impact force received on the impact receiving surface causes the contact member to lose contact with the sensor.

12. The apparatus of claim 10, wherein the contact member does not contact the sensor when at the initial position, and wherein the sensor initiates an alert when an impact force received on the impact receiving surface causes the contact member to contact the sensor.

13. The apparatus of claim 9, wherein the sensor is disposed substantially adjacent the biasing member.

14. The apparatus of claim 13, wherein the sensor initiates the alert when the shift of the contact member causes the biasing member to disturb the sensor.

15. The apparatus of claim 9, wherein the base is separable from the impact receiving surface.

16. A window product, comprising:
 a window pane; and
 an apparatus for dispersing impact forces, comprising:
  a base;
  a contact member positioned to receive force from the window pane;
  a biasing member disposed between the base and the contact member; and
  a sensor;
  wherein the biasing member biases the contact member toward an initial position at the window pane;
  wherein an impact force received on the window pane causes the contact member and the biasing member to move; and
  wherein movement of at least one of the contact member and the biasing member activates the sensor, causing the sensor to initiate an alert.

17. A monitoring system, comprising:
 an input device comprising:
  a housing having a contact end with an aperture;
  a contact member located at least primarily inside the housing;
  a biasing member biasing the contact member toward the housing aperture;
  at least one sensor; and
  means for securing the housing contact end to an impact receiving surface;
 an alarm;
 a processor in data communication with the sensor; and
 electronic instructions that, when executed by the processor, performs steps for:
  (a) receiving at least one signal from the sensor;
  (b) analyzing the at least one signal to identify a triggering event; and
  (c) upon identifying a triggering event, actuating the alarm.

18. The system of claim 17, wherein an impact received upon the impact receiving surface causes the sensor to initiate the at least one signal.

19. The system of claim 17, wherein identifying the triggering event comprises determining whether the signal received from the sensor indicates a force received upon the impact receiving surface greater than a predetermined threshold.

20. The system of claim 17, wherein the impact receiving surface is a window.

* * * * *